United States Patent
Lin et al.

(10) Patent No.: US 10,476,805 B2
(45) Date of Patent: Nov. 12, 2019

(54) NETWORK COMMUNICATION METHOD, DEVICE, AND INTERNET SYSTEM

(71) Applicant: Huawei Technologies Co., Ltd., Shenzhen (CN)

(72) Inventors: Dong Lin, Hong Kong (CN); Gong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 15/608,563

(22) Filed: May 30, 2017

(65) Prior Publication Data
US 2017/0289052 A1 Oct. 5, 2017

Related U.S. Application Data

(63) Continuation of application No. PCT/CN2014/092541, filed on Nov. 28, 2014.

(51) Int. Cl.
*H04L 12/851* (2013.01)
*H04L 12/715* (2013.01)
(Continued)

(52) U.S. Cl.
CPC .......... *H04L 47/2483* (2013.01); *H04L 41/08* (2013.01); *H04L 45/34* (2013.01); *H04L 45/64* (2013.01); *H04L 45/38* (2013.01)

(58) Field of Classification Search
CPC ......... H04L 41/08; H04L 45/34; H04L 45/38; H04L 45/64; H04L 47/2483;
(Continued)

(56) References Cited

U.S. PATENT DOCUMENTS 6,633,901 B1  10/2003  Zuili
8,171,162 B2   5/2012  Sheth
(Continued)

FOREIGN PATENT DOCUMENTS

CN   1440159 A    9/2003
CN  102904810 A   1/2013
(Continued)

OTHER PUBLICATIONS

Foreign Communication From a Counterpart Application, European Application No. 14906947.8, Extended European Search Report dated Oct. 26, 2017, 11 pages.
(Continued)

*Primary Examiner* — Kyaw Z Soe
(74) *Attorney, Agent, or Firm* — Conley Rose, P.C.

(57) ABSTRACT

A network communication method, a device, and an Internet system are presented. The method includes receiving, by a first primary node at a first network layer, first communication information sent, by a non-primary node that initiates communication, to a non-primary node that receives communication, where the non-primary node that initiates communication is in a domain to which the first primary node belongs, and the non-primary node that receives communication is in a different domain at the first network layer; determining, first label information, where the first label information is used to indicate a communication path, at a second network layer, from a node that receives the first communication information to a node that has a mapping relationship with a second primary node to which the non-primary node that receives communication belongs; and sending, first information to a node at the second network layer.

33 Claims, 15 Drawing Sheets

S121

A node at a second network layer receives first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with a second primary node

S122

The node sends, according to the first label information by using the communication path corresponding to the first label information, the first information to the second primary node to which the non-primary node that receives communication belongs

(51) Int. Cl.
*H04L 12/721* (2013.01)
*H04L 12/24* (2006.01)

(58) Field of Classification Search
CPC ..... H04L 45/507; H04L 45/123; H04L 45/50; H04L 65/00; H04W 28/06; H04W 28/22; H04W 40/02; H04W 40/12; H04W 80/02; H04W 84/18; H04W 92/18
See application file for complete search history.

(56) References Cited

U.S. PATENT DOCUMENTS

| | | | |
|---|---|---|---|
| 2006/0034233 A1 | 2/2006 | Strutt et al. | |
| 2013/0142203 A1* | 6/2013 | Koponen | H04L 12/66 370/401 |
| 2013/0329601 A1* | 12/2013 | Yin | H04L 45/02 370/254 |
| 2014/0160918 A1 | 6/2014 | Veerappagowda et al. | |
| 2014/0185450 A1* | 7/2014 | Luo | H04L 45/42 370/236 |
| 2015/0103844 A1* | 4/2015 | Zhao | H04L 45/42 370/410 |
| 2015/0195195 A1* | 7/2015 | Zhang | H04L 45/50 370/400 |

FOREIGN PATENT DOCUMENTS

| | | |
|---|---|---|
| CN | 103166876 A | 6/2013 |
| CN | 103346967 A | 10/2013 |
| CN | 103856402 A | 6/2014 |
| CN | 103888357 A | 6/2014 |

OTHER PUBLICATIONS

Machine Translation and Abstract of Chinese Publication No. CN1440159, Sep. 3, 2003, 28 pages.
Machine Translation and Abstract of Chinese Publication No. CN103166876, Jun. 19, 2013, 17 pages.
Machine Translation and Abstract of Chinese Publication No. CN103346967, Oct. 9, 2013, 9 pages.
Machine Translation and Abstract of Chinese Publication No. CN103856402, Jun. 11, 2014, 18 pages.
Machine Translation and Abstract of Chinese Publication No. CN103888357, Jun. 25, 2014, 8 pages.
"International Space Station to Beam Video via Laser Back to Earth," NASA, Apr. 11, 2014, 4 pages.
"OpenFlow-enabled Transport SDN," ONF Solution Brief, May 27, 2014, 16 pages.
"OpenFlow Switch Specification," Version 1.0.0, (Wire Protocol 0x01), Dec. 31, 2009, 44 pages.
"Your Data Center Is a Router: The Case for Reconfigurable Optical Circuit Switched Paths," Computer Science Department, Oct. 2009, 8 pages.
Foreign Communication From a Counterpart Application, PCT Application No. PCT/CN2014/092541, English Translation of International Search Report dated Aug. 20, 2015, 2 pages.
Foreign Communication From a Counterpart Application, PCT Application No. PCT/CN2014/092541, English Translation of Written Opinion dated Aug. 20, 2015, 6 pages.

* cited by examiner

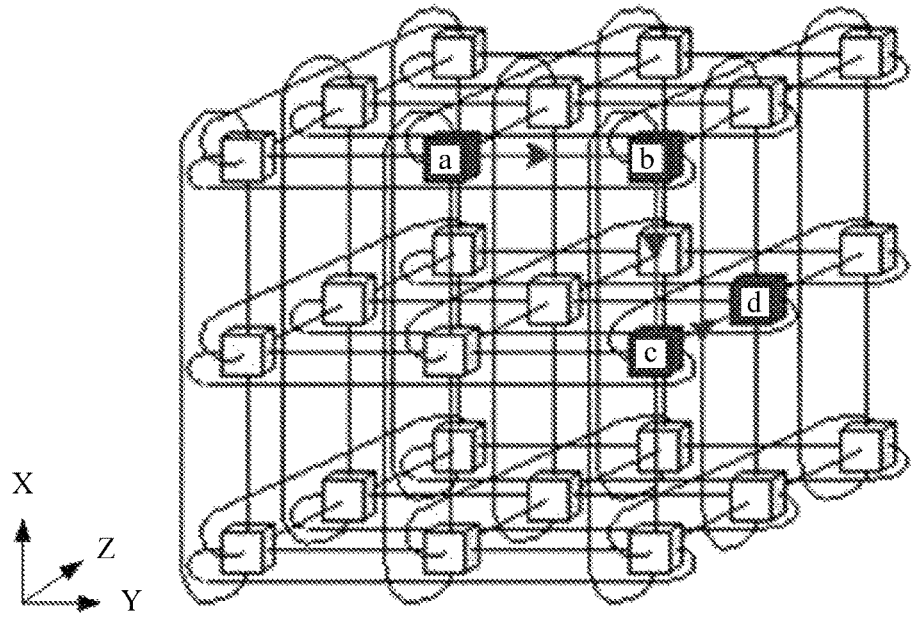

A second primary node at a first network layer receives first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the second primary node belongs, the non-primary node that receives communication is in the domain to which the second primary node belongs, and the first label information is used to indicate a communication path, at the second network layer, from a node that receives the first communication information to a node that has a mapping relationship with the second primary node

S112

The second primary node removes the first label information from the first information, and sends the first information obtained after the removing processing to the non-primary node that receives communication

FIG. 11

NETWORK COMMUNICATION METHOD, DEVICE, AND INTERNET SYSTEM

CROSS-REFERENCE TO RELATED APPLICATIONS

This application is a continuation of International Application No. PCT/CN2014/092541, filed on Nov. 28, 2014. The disclosure of the aforementioned application is hereby incorporated by reference in its entirety.

TECHNICAL FIELD

The present disclosure relates to the field of Internet technologies, and in particular, to a network communication method, a device, and an Internet system.

BACKGROUND

The Internet has decades of history of being used as a basis of supporting today's information-based society, and directly serves billions of users worldwide. A traditional Internet network architecture features in tree-like layering and stage-by-stage aggregation. As a subset of the Internet, a metropolitan area network starting from a first network layer that directly serves a terminal user needs to pass through a county aggregation node and a city core node in turn, to finally connect to a provincial core node. A network performance bottleneck is easily caused because of many network layers and links, which restricts a user access speed, and in addition, management is complex, and scalability is poor.

To resolve the foregoing problems, an OpenFlow® protocol is put forward, and a forwarding/control separation architecture is used in this protocol. An external control plane entity controls, using the OpenFlow protocol, a forwarding plane device to implement various types of forwarding logic. A main function of the forwarding plane device is performing controlled forwarding according to a flow table delivered by an OpenFlow controller, and the act of the forwarding plane device is standard. That is, a switch receives a packet, extracts a header-related field value from the packet, and uses the field value as a keyword to search the flow table; and after the field value matches an entry, changes a packet field according to an instruction set in content of the entry, and forwards the changed packet field to a logical or physical port according to an instruction. This protocol further evolves into a basis of a software-defined networking (SDN) technology, that is, various complex network applications may be implemented on a control plane by means of software programming, and no change needs to be made to the forwarding plane device. Because the control plane is implemented using a general server and a general-purpose operating system, which may be implemented using a general software programming tool, or may be implemented using a script programming language such as Python, a new network protocol easily gains support and a period for deploying a new technology is greatly shortened. Compared with a traditional network, an SDN network is much stricter about communication procedure control. Communication can be established only when any end-to-end communication request is first approved by a response network controller and configuration on a related device in a path is completed.

A basic OpenFlow network includes two main control entities: a network controller and a switch. Generally, a centralized network controller is deployed in the network, and is responsible for domain control management of all OpenFlow switches in an entire network domain. However, as a network scale continuously increases, a throughput for processing a path switch request by a network controller is limited, which reduces processing efficiency of the network controller, and a prominent problem is poor network scalability.

SUMMARY

Embodiments of the present disclosure provide a network communication method, a device, and an Internet system, which resolve a problem that in an existing OpenFlow mechanism, a throughput for processing a path switch request by a network controller is limited, thereby causing reduction in processing efficiency of the network controller and poor network scalability.

According to a first aspect, a network communication method is provided, where the method is applied to multi-layer network communication, and the method includes receiving, by a first primary node at a first network layer, first communication information sent, by a non-primary node that initiates communication, to a non-primary node that receives communication, where the non-primary node that initiates communication is in a domain to which the first primary node belongs, and the non-primary node that receives communication is in a different domain at the first network layer; determining, by the first primary node, first label information, where the first label information is used to indicate a communication path, at a second network layer, from a node that receives the first communication information to a node that has a mapping relationship with a second primary node to which the non-primary node that receives communication belongs; and sending, by the first primary node, first information to a node at the second network layer, so that the node at the second network layer sends the first information to the second primary node according to the first label information using the communication path corresponding to the first label information, where the first information includes the first communication information and the first label information.

With reference to the first aspect, in a first possible implementation manner, the determining, by the first primary node, first label information includes, if determining that a label processing rule table stored by the first primary node includes label information corresponding to the communication path, determining, by the first primary node, the label information included in the label processing rule table as the first label information; or if determining that a label processing rule table stored by the first primary node does not include label information corresponding to the communication path, sending, by the first primary node, the first communication information to a first domain controller to which the first primary node belongs, and determining label information returned by the first domain controller as the first label information.

With reference to the first possible implementation manner of the first aspect, in a second possible implementation manner, after the sending, by the first primary node, the first communication information to a first domain controller to which the first primary node belongs, the method further includes receiving, by the first primary node, label information that is allocated by the first domain controller to a communication path selected from the second network layer, where the selected communication path is from the node that receives the first communication information to the node that has the mapping relationship with the second primary node to which the non-primary node that receives communication belongs; and updating, according to the received label information, the label processing rule table stored by the first primary node; where after receiving the first information sent by the first primary node, the first domain controller selects, from the second network layer according to control information that is released by the second network layer and used to indicate a load status of each node at the second network layer, the communication path from the node that receives the first communication information to the node that has the mapping relationship with the second primary node to which the non-primary node that receives communication belongs; allocates the label information to the selected communication path; and sends the allocated label information to the first primary node.

With reference to the first aspect, the first possible implementation manner of the first aspect, or the second possible implementation manner of the first aspect, in a third possible implementation manner, the method further includes receiving, by the first primary node, label information that is allocated by the first domain controller to which the first primary node belongs to a communication path reselected from the second network layer, where the reselected communication path is from the node that receives the first communication information to the node that has the mapping relationship with the second primary node to which the non-primary node that receives communication belongs; and updating, according to the received label information, the label processing rule table stored by the first primary node; where after receiving the control information that is released by the second network layer and used to indicate the load status of each node at the second network layer, if determining, according to the control information, that the communication path needs to be updated, the first domain controller reselects, from the second network layer, the communication path from the node that receives the first communication information to the node that has the mapping relationship with the second primary node to which the non-primary node that receives communication belongs; allocates the label information to the reselected communication path; and sends the allocated label information to the first primary node.

With reference to the first aspect, the first possible implementation manner of the first aspect, the second possible implementation manner of the first aspect, or the third possible implementation manner of the first aspect, in a fourth possible implementation manner, the first label information includes encoding information of each node in the communication path, at the second network layer, from the node that receives the first communication information to the node that has the mapping relationship with the second primary node; or encoding information of a link between nodes in the communication path, at the second network layer, from the node that receives the first communication information to the node that has the mapping relationship with the second primary node; or encoding information of a port of each node in the communication path, at the second network layer, from the node that receives the first communication information to the node that has the mapping relationship with the second primary node; or location coordinate information and routing direction information that are of the node that is at the second network layer and receives the first communication information and the node that is at the second network layer and has the mapping relationship with the second primary node.

According to a second aspect, a network communication method is provided, where the method is applied to multilayer network communication, and the method includes receiving, by a second primary node at a first network layer, first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the second primary node belongs, the non-primary node that receives communication is in the domain to which the second primary node belongs, and the first label information is used to indicate a communication path, at the second network layer, from a node that receives the first communication information to a node that has a mapping relationship with the second primary node; and removing, by the second primary node, the first label information from the first information, and sending the first information obtained after the removing processing to the non-primary node that receives communication.

With reference to the second aspect, in a first possible implementation manner, the removing, by the second primary node, the first label information from the first information, and sending the first information obtained after the removing processing to the non-primary node that receives communication includes processing, by the second primary node, the first information according to a processing rule that is in a label processing rule table stored by the second primary node and that is used to instruct to process the first information including the first label information, where the processing rule instructs to remove the first label information from the first information, and send the first information obtained after the removing processing to the non-primary node that receives communication.

With reference to the first possible implementation manner of the second aspect, in a second possible implementation manner, the processing, by the second primary node, the first information according to a processing rule that is in a label processing rule table stored by the second primary node and that is used to instruct to process the first information including the first label information includes, if the second primary node determines that the label processing rule table stored by the second primary node includes a processing rule that is used to instruct to process the first information including the first label information, processing, by the second primary node, the first information according to the processing rule included in the label processing rule table; or if the second primary node determines that the label processing rule table stored by the second primary node does not include a processing rule that is used to instruct to process the first information including the first label information, sending, by the second primary node, the first information to a second domain controller to which the second primary node belongs, and processing the first information according to a processing rule returned by the second domain controller.

With reference to the second possible implementation manner of the second aspect, in a third possible implementation manner, after the sending, by the second primary node, the first information to a second domain controller to which the second primary node belongs, the method further includes receiving, by the second primary node, a processing rule configured by the second domain controller for the first information, and updating, according to the received processing rule, the label processing rule table stored by the second primary node; where after receiving the first information sent by the second primary node, the second domain controller configures the processing rule for the first information, so as to instruct to remove the first label information from the first information, and send the first information obtained after the removing processing to the non-primary node that receives communication.

With reference to the second possible implementation manner of the second aspect, in a fourth possible implementation manner, the method further includes receiving, by the second primary node, second label information sent by the second domain controller, and updating, according to the received second label information, the label processing rule table stored by the second primary node, where the second label information is used to indicate a communication path, at the second network layer, from a node that receives second communication information to a node that has a mapping relationship with the first primary node, and the second communication information is sent from the non-primary node that receives communication to the non-primary node that sends communication; where after receiving the first information sent by the second sending module, the second domain controller selects, from the second network layer according to control information that is released by the second network layer and used to indicate a load status of each node at the second network layer, the communication path from the node that receives the second communication information to the node that has the mapping relationship with the first primary node; allocates the second label information to the selected communication path; and sends the second label information to the second primary node.

With reference to the fourth possible implementation manner of the second aspect, in a fifth possible implementation manner, the method further includes receiving, by the second primary node, second label information that is allocated by the second domain controller to a communication path reselected for transmitting the second communication information, and updating, according to the received second label information, the label processing rule table stored by the second primary node; where after receiving the control information that is released by the second network layer and used to indicate the load status of each node at the second network layer, if determining, according to the control information, that the communication path, at the second network layer, from the node that receives the second communication information to the node that has the mapping relationship with the first primary node needs to be updated, the second domain controller reselects, from the second network layer, the communication path from the node that receives the second communication information to the node that has the mapping relationship with the first primary node; allocates the second label information to the reselected communication path; and sends the allocated second label information to the second primary node.

With reference to the fourth possible implementation manner of the second aspect or the fifth possible implementation manner of the second aspect, in a sixth possible implementation manner, the second label information includes encoding information of each node in the communication path, at the second network layer, from the node that receives the second communication information to the node that has the mapping relationship with the first primary node; or encoding information of a link between nodes in the communication path, at the second network layer, from the node that receives the second communication information to the node that has the mapping relationship with the first primary node; or encoding information of a port of each node in the communication path, at the second network layer, from the node that receives the second communication information to the node that has the mapping relationship with the first primary node; or location coordinate information and preset routing direction information that are of the node that is at the second network layer and receives the second communication information and the node that is at the second network layer and has the mapping relationship with the first primary node.

With reference to any one of the second aspect or the first to the sixth possible implementation manners of the second aspect, in a seventh possible implementation manner, the first label information includes encoding information of each node in the communication path, at the second network layer, from the node that receives the first communication information to the node that has the mapping relationship with the second primary node; or encoding information of a link between nodes in the communication path, at the second network layer, from the node that receives the first communication information to the node that has the mapping relationship with the second primary node; or encoding information of a port of each node in the communication path, at the second network layer, from the node that receives the first communication information to the node that has the mapping relationship with the second primary node; or location coordinate information and preset routing direction information that are of the node that is at the second network layer and receives the first communication information and the node that is at the second network layer and has the mapping relationship with the second primary node.

According to a third aspect, a network communication method is provided, where the method is applied to multi-layer network communication, and the method includes receiving, by a node at a second network layer, first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with the second primary node; and sending, by the node according to the first label information using the communication path corresponding to the first label information, the first information to the second primary node to which the non-primary node that receives communication belongs.

With reference to the third aspect, in a first possible implementation manner, the first label information includes encoding information of each node in the communication path, at the second network layer, from the node that receives the first communication information to the node that has the mapping relationship with the second primary node; or encoding information of a link between nodes in the communication path, at the second network layer, from the node that receives the first communication information to the node that has the mapping relationship with the second primary node; or encoding information of a port of each node in the communication path, at the second network layer, from the node that receives the first communication information to the node that has the mapping relationship with the second primary node; or location coordinate information and preset routing direction information that are of the node that is at the second network layer and receives the first communication information and the node that is at the second network layer and has the mapping relationship with the second primary node.

According to a fourth aspect, a node device is provided, where the node device is applied to multi-layer network communication, and the node device includes a first receiving module configured to receive first communication information sent, by a non-primary node that initiates communication, to a non-primary node that receives communication, where the non-primary node that initiates communication is in a domain to which the first receiving module belongs, and the non-primary node that receives communication is in a different domain at the first network layer; a determining module configured to determine first label information, where the first label information is used to indicate a communication path, at a second network layer, from a node that receives the first communication information to a node that has a mapping relationship with a second primary node to which the non-primary node that receives communication belongs; and a first sending module configured to send first information to a node at the second network layer, so that the node at the second network layer sends the first information to the second primary node according to the first label information using the communication path corresponding to the first label information, where the first information includes the first communication information and the first label information.

With reference to the fourth aspect, in a first possible implementation manner, the determining module is configured to, if determining that a label processing rule table stored by the node device includes label information corresponding to the communication path, determine the label information included in the label processing rule table as the first label information; or if determining that a label processing rule table stored by the node device does not include label information corresponding to the communication path, send, using the first sending module, the first communication information to a first domain controller to which the node device belongs, and determine label information returned by the first domain controller as the first label information.

With reference to the first possible implementation manner of the fourth aspect, in a second possible implementation manner, after the first sending module sends the first communication information to the first domain controller, the determining module is further configured to receive, using the first receiving module, label information that is allocated by the first domain controller to a communication path selected from the second network layer, where the selected communication path is from the node that receives the first communication information to the node that has the mapping relationship with the second primary node to which the non-primary node that receives communication belongs; and update, according to the received label information, the label processing rule table stored by the node device; where after receiving the first information sent by the first sending module, the first domain controller selects, from the second network layer according to control information that is released by the second network layer and used to indicate a load status of each node at the second network layer, the communication path from the node that receives the first communication information to the node that has the mapping relationship with the second primary node to which the non-primary node that receives communication belongs; allocates the label information to the selected communication path; and sends the allocated label information to the first receiving module.

With reference to the fourth aspect, the first possible implementation manner of the fourth aspect, or the second possible implementation manner of the fourth aspect, in a third possible implementation manner, the determining module is further configured to receive, using the first receiving module, label information that is allocated by the first domain controller to which the node device belongs to a communication path reselected from the second network layer, where the reselected communication path is from the node that receives the first communication information to the node that has the mapping relationship with the second primary node to which the non-primary node that receives communication belongs; and update, according to the received label information, the label processing rule table stored by the node device; where after receiving the control information that is released by the second network layer and used to indicate the load status of each node at the second network layer, if determining, according to the control information, that the communication path for transmitting the first communication information needs to be updated, the first domain controller reselects, from the second network layer, the communication path from the node that receives the first communication information to the node that has the mapping relationship with the second primary node to which the non-primary node that receives communication belongs; allocates the label information to the reselected communication path; and sends the allocated label information to the first receiving module.

According to a fifth aspect, a node device is provided, where the node device is applied to multi-layer network communication, and the node device includes a second receiving module configured to receive first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the second receiving module belongs, the non-primary node that receives communication is in the domain to which the second receiving module belongs, and the first label information is used to indicate a communication path, at the second network layer, from a node that receives the first communication information to a node that has a mapping relationship with the node device; a processing module configured to remove the first label information from the first information; and a second sending module configured to send the first information obtained after the processing module performs the removing processing to the non-primary node that receives communication.

With reference to the fifth aspect, in a first possible implementation manner, the processing module is configured to process the first information according to a processing rule that is in a label processing rule table stored by the node device and that is used to instruct to process the first information including the first label information, where the processing rule instructs to remove the first label information from the first information, and send the first information obtained after the removing processing to the non-primary node that receives communication.

With reference to the first possible implementation manner of the fifth aspect, in a second possible implementation manner, the processing, by the processing module, the first information according to a processing rule that is in a label processing rule table stored by the node device and that is used to instruct to process the first information including the first label information includes, if it is determined that the label processing rule table stored by the node device includes a processing rule that is used to instruct to process the first information including the first label information, processing the first information according to the processing rule included in the label processing rule table; or if it is determined that the label processing rule table stored by the node device does not include a processing rule that is used to instruct to process the first information including the first label information, sending, using the second sending module, the first information to a second domain controller to which the node device belongs, and processing the first information according to a processing rule returned by the second domain controller.

With reference to the second possible implementation manner of the fifth aspect, in a third possible implementation manner, after the second sending module sends the first information to the second domain controller to which the node device belongs, the processing module is further configured to receive, using the second receiving module, a processing rule configured by the second domain controller for the first information, and update, according to the received processing rule, the label processing rule table stored by the node device; where after receiving the first information sent by the second sending module, the second domain controller configures the processing rule for the first information, so as to instruct to remove the first label information from the first information, and send the first information obtained after the removing processing to the non-primary node that receives communication.

With reference to the second possible implementation manner of the fifth aspect, in a fourth possible implementation manner, the processing module is further configured to receive, using the second receiving module, second label information sent by the second domain controller, and update, according to the received second label information, the label processing rule table stored by the node device, where the second label information is used to indicate a communication path, at the second network layer, from a node that receives second communication information to a node that has a mapping relationship with the first primary node, and the second communication information is sent from the non-primary node that receives communication to the non-primary node that sends communication; where after receiving the first information sent by the second sending module, the second domain controller selects, from the second network layer according to control information that is released by the second network layer and used to indicate a load status of each node at the second network layer, the communication path from the node that receives the second communication information to the node that has the mapping relationship with the first primary node; allocates the second label information to the selected communication path; and sends the second label information to the second receiving module.

With reference to the fourth possible implementation manner of the fifth aspect, in a fifth possible implementation manner, the processing module is further configured to receive, using the second receiving module, second label information that is allocated by the second domain controller to a communication path reselected from the second network layer, where the reselected communication path is from the node that receives the second communication information to the node that has the mapping relationship with the first primary node; and update, according to the received second label information, the label processing rule table stored by the node device; where after receiving the control information that is released by the second network layer and used to indicate the load status of each node at the second network layer, if determining, according to the control information, that the communication path, at the second network layer, from the node that receives the second communication information to the node that has the mapping relationship with the first primary node needs to be updated, the second domain controller reselects, from the second network layer, the communication path from the node that receives the second communication information to the node that has the mapping relationship with the first primary node; allocates the second label information to the reselected communication path; and sends the allocated second label information to the second receiving module.

According to a sixth aspect, a node device is provided, where the node device is applied to multi-layer network communication, and the node device includes a third receiving module configured to receive first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with the second primary node; and a third sending module configured to send, according to the first label information using the communication path corresponding to the first label information, the first information to the second primary node to which the non-primary node that receives communication belongs.

According to a seventh aspect, an Internet system is provided, where the system includes a first network layer and a second network layer, where the first network layer is divided into at least one domain according to a range of exchanging or routing communication information; each domain includes a non-primary node and at least one primary node configured to control data exchange or data routing in the domain; each primary node controls a non-primary node in a domain to which the primary node belongs to perform inter-domain or intra-domain communication; a primary node at the first network layer includes a first primary node to which a non-primary node that initiates communication belongs and a second primary node to which a non-primary node that receives communication belongs; and the second network layer includes at least one node; where the first primary node is configured to receive first communication information sent, by the non-primary node that initiates communication, to the non-primary node that receives communication, where the non-primary node that initiates communication is in a domain to which the first primary node belongs, and the non-primary node that receives communication is in a different domain at the first network layer; determine first label information, where the first label information is used to indicate a communication path, at the second network layer, from a node that receives the first communication information to a node that has a mapping relationship with the second primary node to which the non-primary node that receives communication belongs; and send first information to a node at the second network layer, where the first information includes the first communication information and the first label information; the node at the second network layer is configured to receive the first information sent by the first primary node; and send, according to the first label information using the communication path corresponding to the first label information, the first information to the second primary node to which the non-primary node that receives communication belongs; and the second primary node is configured to receive the first information sent by the node at the second network layer; and remove the first label information from the first information, and send the first information obtained after the removing processing to the non-primary node that receives communication.

With reference to the seventh aspect, in a first possible implementation manner, the system further includes: a third network layer configured to, after receiving the first information sent by the first primary node, perform format conversion on the first information, and forward the first information obtained after the format conversion to the second network layer; or after receiving the first information sent by the first primary node, cache the first information sent by the first primary node.

According to an eighth aspect, a node device is provided, where the node device is applied to multi-layer network communication, and the node device includes a transceiver configured to receive first communication information sent, by a non-primary node that initiates communication, to a non-primary node that receives communication, where the non-primary node that initiates communication is in a domain to which the transceiver belongs, and the non-primary node that receives communication is in a domain at the first network layer different from the domain to which the transceiver belongs; and a processor configured to determine first label information, where the first label information is used to indicate a communication path, at a second network layer, from a node that receives the first communication information to a node that has a mapping relationship with a second primary node to which the non-primary node that receives communication belongs; and send, using the transceiver, first information to a node at the second network layer, so that the node at the second network layer sends the first information to the second primary node according to the first label information using the communication path corresponding to the first label information, where the first information includes the first communication information and the first label information.

With reference to the eighth aspect, in a first possible implementation manner, the processor is configured to, if determining that a label processing rule table stored by the node device includes label information corresponding to the communication path, determine the label information included in the label processing rule table as the first label information; or if determining that a label processing rule table stored by the node device does not include label information corresponding to the communication path, send, using the transceiver, the first communication information to a first domain controller to which the node device belongs, and determine label information returned by the first domain controller as the first label information.

With reference to the first possible implementation manner of the eighth aspect, in a second possible implementation manner, after the transceiver sends the first communication information to the first domain controller, the processor is further configured to receive, using the transceiver, label information that is allocated by the first domain controller to a communication path selected from the second network layer, where the selected communication path is from the node that receives the first communication information to the node that has the mapping relationship with the second primary node to which the non-primary node that receives communication belongs; and update, according to the received label information, the label processing rule table stored by the node device; where after receiving the first information sent by the transceiver, the first domain controller selects, from the second network layer according to control information that is released by the second network layer and used to indicate a load status of each node at the second network layer, the communication path from the node that receives the first communication information to the node that has the mapping relationship with the second primary node to which the non-primary node that receives communication belongs; allocates the label information to the selected communication path; and sends the allocated label information to the transceiver.

With reference to the eighth aspect, the first possible implementation manner of the eighth aspect, or the second possible implementation manner of the eighth aspect, in a third possible implementation manner, the processor is further configured to receive, using the transceiver, label information that is allocated by the first domain controller to which the node device belongs to a communication path reselected from the second network layer, where the reselected communication path is from the node that receives the first communication information to the node that has the mapping relationship with the second primary node to which the non-primary node that receives communication belongs; and update, according to the received label information, the label processing rule table stored by the node device; where after receiving the control information that is released by the second network layer and used to indicate the load status of each node at the second network layer, if determining, according to the control information, that the communication path for transmitting the first communication information needs to be updated, the first domain controller reselects, from the second network layer, the communication path from the node that receives the first communication information to the node that has the mapping relationship with the second primary node to which the non-primary node that receives communication belongs; allocates the label information to the reselected communication path; and sends the allocated label information to the transceiver.

According to a ninth aspect, a node device is provided, where the node device is applied to multi-layer network communication, and the node device includes a transceiver configured to receive first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the node device belongs, the non-primary node that receives communication is in a domain to which the transceiver belongs, and the first label information is used to indicate a communication path, at the second network layer, from a node that receives the first communication information to a node that has a mapping relationship with the node device; and a processor configured to remove the first label information from the first information; and send, using the transceiver, the first information obtained after the removing processing to the non-primary node that receives communication.

With reference to the ninth aspect, in a first possible implementation manner, the processor is configured to process the first information according to a processing rule that is in a label processing rule table stored by the node device and that is used to instruct to process the first information including the first label information, where the processing rule instructs to remove the first label information from the first information, and send the first information obtained after the removing processing to the non-primary node that receives communication.

With reference to the first possible implementation manner of the ninth aspect, in a second possible implementation manner, the processing, by the processor, the first information according to a processing rule that is in a label processing rule table stored by the node device and that is used to instruct to process the first information including the first label information includes, if it is determined that the label processing rule table stored by the node device includes a processing rule that is used to instruct to process the first information including the first label information, processing the first information according to the processing rule included in the label processing rule table; or if it is determined that the label processing rule table stored by the node device does not include a processing rule that is used to instruct to process the first information including the first label information, sending, using the transceiver, the first information to a second domain controller to which the node device belongs, and processing the first information according to a processing rule returned by the second domain controller.

With reference to the second possible implementation manner of the ninth aspect, in a third possible implementation manner, after the transceiver sends the first information to the second domain controller to which the node device belongs, the processor is further configured to receive, using the transceiver, a processing rule configured by the second domain controller for the first information, and update, according to the received processing rule, the label processing rule table stored by the node device; where after receiving the first information sent by the transceiver, the second domain controller configures the processing rule for the first information, so as to instruct to remove the first label information from the first information, and send the first information obtained after the removing processing to the non-primary node that receives communication.

With reference to the second possible implementation manner of the ninth aspect, in a fourth possible implementation manner, the processor is further configured to receive, using the transceiver, second label information sent by the second domain controller, and update, according to the received second label information, the label processing rule table stored by the node device, where the second label information is used to indicate a communication path, at the second network layer, from a node that receives second communication information to a node that has a mapping relationship with the first primary node, and the second communication information is sent from the non-primary node that receives communication to the non-primary node that sends communication; where after receiving the first information sent by the transceiver, the second domain controller selects, from the second network layer according to control information that is released by the second network layer and used to indicate a load status of each node at the second network layer, the communication path from the node that receives the second communication information to the node that has the mapping relationship with the first primary node; allocates the second label information to the selected communication path; and sends the second label information to the transceiver.

With reference to the fourth possible implementation manner of the ninth aspect, in a fifth possible implementation manner, the processor is further configured to receive, using the transceiver, second label information that is allocated by the second domain controller to a communication path reselected from the second network layer, where the reselected communication path is from the node that receives the second communication information to the node that has the mapping relationship with the first primary node; and update, according to the received second label information, the label processing rule table stored by the node device; where after receiving the control information that is released by the second network layer and used to indicate the load status of each node at the second network layer, if determining, according to the control information, that the communication path, at the second network layer, from the node that receives the second communication information to the node that has the mapping relationship with the first primary node needs to be updated, the second domain controller reselects, from the second network layer, the communication path from the node that receives the second communication information to the node that has the mapping relationship with the first primary node; allocates the second label information to the reselected communication path; and sends the allocated second label information to the transceiver.

According to a tenth aspect, a node device is provided, where the node device is applied to multi-layer network communication, and the node device includes a receiver configured to receive first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with the second primary node; and a transmitter configured to send, according to the first label information using the communication path corresponding to the first label information, the first information to the second primary node to which the non-primary node that receives communication belongs.

According to the method, the device, and the system provided in the embodiments of the present disclosure, by means of label information management, an inter-domain communication path is selected, and inter-domain exchange/routing of communication information and fast network access are implemented, thereby reducing a network latency. Because control logic is distributed at a first network layer and a second network layer, only forwarding of communication information is implemented based on label information at the second network layer, which resolves a management bottleneck in large-scale deployment and accelerates a response speed of the control logic.

BRIEF DESCRIPTION OF DRAWINGS

FIG. 10 is a schematic diagram of a fourth type of label information according to an embodiment of the present disclosure;

FIG. 11 is a schematic diagram of a second network communication method according to an embodiment of the present disclosure;

DESCRIPTION OF EMBODIMENTS

Embodiments of the present disclosure provide a new Internet system architecture of an Information Consumption-oriented Network (ICON), and the new network architecture evolves into a scale-free network architecture. A connection hop count is reduced and a network feedback mechanism is introduced, so that more network resources are dynamically allocated to a super node (that is, a type of node with a high "degree" in a scale-free network, where the "degree" represents a quantity of edges directly connected to the node in the scale-free network) on demand, thereby improving overall network efficiency. In the new architecture, a scalability problem of a traditional Internet architecture is resolved and fast access of a terminal user is implemented. In addition, a network information consumption feature can be well adapted, and network latency is reduced, thereby implementing simple and high-efficiency network management.

The following first further describes in detail an Internet system provided in the embodiments of the present disclosure with reference to the accompanying drawings of the specification. It should be understood that the embodiments described herein are merely used to illustrate and explain the present disclosure, but are not intended to limit the present disclosure.

Figure 1:
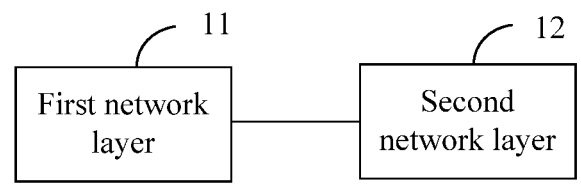
FIG. 1 is a schematic structural diagram of a first Internet system according to an embodiment of the present disclosure.

An embodiment of the present disclosure provides an Internet system. As shown in FIG. 1, the system includes a first network layer 11 and a second network layer 12. The first network layer 11 is divided into at least one domain according to a range of exchanging or routing communication information. Each domain includes a non-primary node and at least one primary node configured to control data exchange or data routing in the domain. A primary node at the first network layer 11 includes a first primary node to which a non-primary node that initiates communication belongs and a second primary node to which a non-primary node that receives communication belongs, where the non-primary node that sends communication and the non-primary node that receives communication are located in different domains. The second network layer 12 includes at least one node.

The first primary node is configured to receive first communication information sent, by the non-primary node that initiates communication, to the non-primary node that receives communication, where the non-primary node that initiates communication is in a domain to which the first primary node belongs, and the non-primary node that receives communication is in a different domain at the first network layer; determine first label information, where the first label information is used to indicate a communication path, at the second network layer, from a node that receives the first communication information to a node that has a mapping relationship with the second primary node to which the non-primary node that receives communication belongs; and send first information to a node at the second network layer, where the first information includes the first communication information and the first label information.

The node at the second network layer 12 is configured to receive the first information sent by the first primary node; and send, according to the first label information using the communication path corresponding to the first label information, the first information to the second primary node to which the non-primary node that receives communication belongs.

The second primary node is configured to receive the first information sent by the node at the second network layer; and remove the first label information from the first information, and send the first information obtained after the removing processing to the non-primary node that receives communication.

In this embodiment of the present disclosure, to distinguish a primary node to which a non-primary node that sends communication information belongs from a primary node to which a non-primary node that receives the communication information belongs, a first primary node and a second primary node are used, but no limitation is constituted to a quantity of primary nodes in different domains and operation priorities of the primary nodes. The first primary node refers to the primary node to which the non-primary node that sends the communication information belongs, and the second primary node refers to the primary node to which the non-primary node that receives the communication information belongs. Because direct communication may be performed between different non-primary nodes in a same domain without using a second network layer, an example of communication between two non-primary nodes in different domains is used in this embodiment of the present disclosure for description.

In this embodiment of the present disclosure, communication information transmitted between non-primary nodes located in different domains may be a message (such as a request message or a response message) that carries signaling, or may be a message that carries data or a signal.

In the Internet system provided in this embodiment of the present disclosure, the first network layer provides an access service for a communications device (such as a user terminal, a base station, a switch, or a router) located at the first network layer. The first network layer is divided into at least one domain according to a range of exchanging or routing communication information. Each domain has one or more primary nodes and one or more non-primary nodes. The primary node is responsible for intra-domain exchange and routing of communication information, and uplink and downlink traffic aggregation. Direct communication may be performed between intra-domain non-primary nodes, and communication is performed between non-primary nodes in different domains using a primary node and the second network layer. An intra-domain primary node may be a communications device that provides access, such as a router, a base station, or a switch. An intra-domain non-primary node may be a communications device such as a user terminal.

Figure 2:
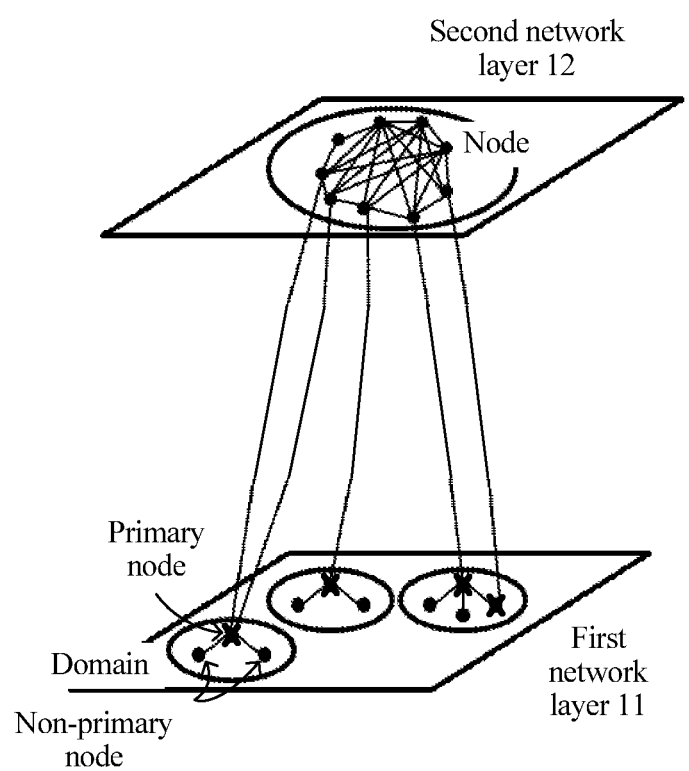
FIG. 2 is a schematic structural diagram of a second Internet system according to an embodiment of the present disclosure.

The second network layer is responsible for exchanging and routing communication information in different domains at the first network layer. There is a mapping relationship between a node at the second network layer and a primary node at the first network layer. The mapping relationship may be: 1:1 (that is, each node at the second network layer is corresponding to only one primary node at the first network layer), 1:n (that is, each node at the second network layer is corresponding to at least two primary nodes at the first network layer), or n:1 (that is, each primary node at the first network layer is corresponding to at least two nodes at the second network layer). A specific mapping relationship is shown in FIG. 2. A node at the second network layer implements protocol-independent fast forwarding on corresponding communication information at the second network layer according to label information of the communication information. The second network layer is corresponding to a controller configured to release corresponding control information to the first network layer according to current actual network load of the second network layer.

Figure 3:
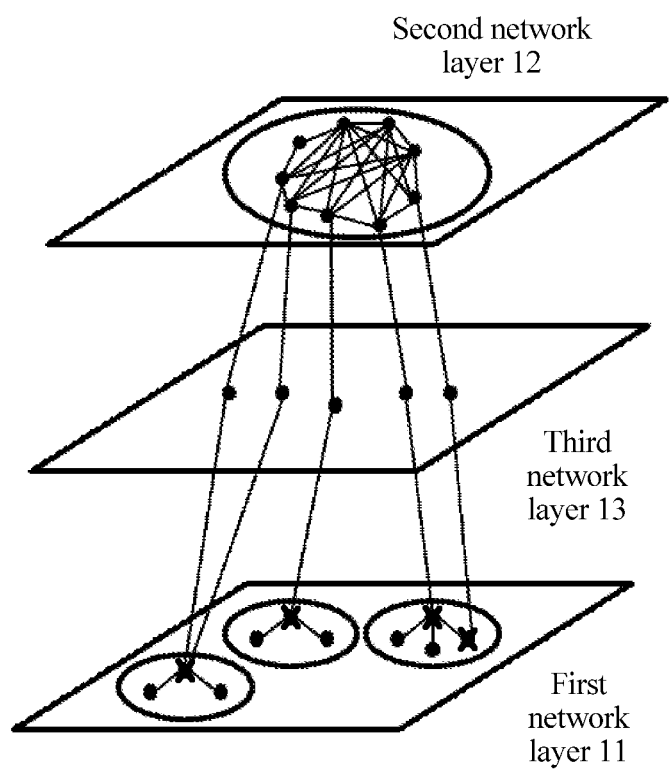
FIG. 3 is a schematic structural diagram of a third Internet system according to an embodiment of the present disclosure.

In implementation, as shown in FIG. 3, the system further includes a third network layer 13 configured to, after receiving the first information sent by the first primary node, perform format conversion on the first information, and forward the first information obtained after the format conversion to the second network layer 12; or after receiving the first information sent by the first primary node, cache the first information sent by the first primary node.

In the Internet system provided in this embodiment of the present disclosure, the third network layer is not responsible for exchanging or routing any communication information, but is responsible for direct communication between a primary node in each domain at the first network layer and the second network layer (that is, providing, for a primary node in each domain at the first network layer, channel resources of one or more paths to the second network layer), and providing necessary relay and format conversion of communication information.

Figure 4:
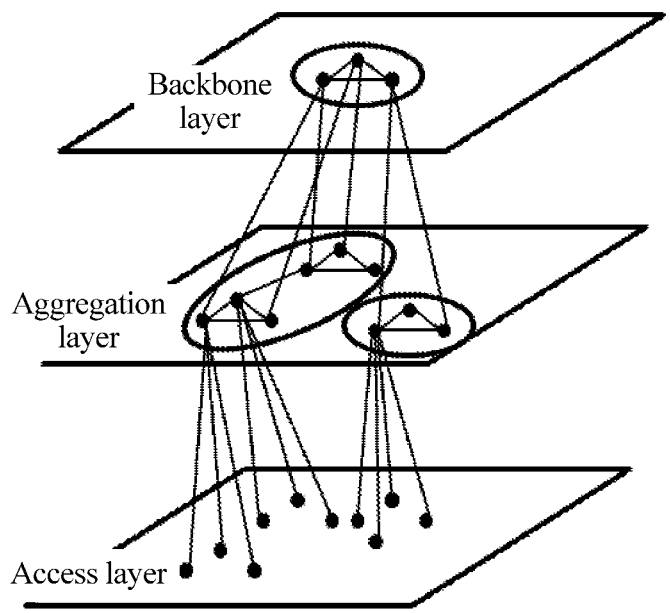
FIG. 4 is a schematic structural diagram of a traditional Internet system.

Compared with a traditional network architecture shown in FIG. 4, the Internet system that is provided in this embodiment of the present disclosure and shown in FIG. 3 has the following features. First, exchange and routing in the new architecture are concentrated at two the first network layer and the second network layer, and an intermediate third network layer is not involved in exchange/routing; and only stable end-to-end communication is provided, and communications links are logically edge-disjoint. Second, different from an effect range of an aggregation layer in the traditional network architecture, an effect range of exchange/routing at the first network layer is generally a communication distance, and is limited to a relatively small range, and without a third network layer and a second network layer, the first network layer is presented as a communication island; however, the traditional network architecture may still ensure considerable-scale mutual communication without support of a backbone layer. Finally, the second network layer in the new architecture is more flatter than the backbone layer in the traditional network architecture, a quantity of nodes at the second network layer is in direct proportion to a quantity of domains at the first network layer, and there is a direct connection of a simple mapping relationship between a node at the second network layer and a domain at the first network layer; however, in the traditional network architecture, a quantity of nodes at each layer presents to be gradually decreased from an access layer to the backbone layer, and there is a clear sense of hierarchy and a clear subordination relationship between nodes at layers.

A network control mechanism provided in this embodiment of the present disclosure features: all data exchange is concentrated at the second network layer, and the exchange at the second network layer is label-based, protocol-independent, and content-independent; there is one-way control between the second network layer and the first network layer; and there is no direct control information exchange between domains at the first network layer, and based on a local copy of control information of the second network layer (that is, control information released by the second network layer) and information about a domain controller in each domain at the first network layer, the domain controller in each domain at the first network layer considers a possible act in another domain, selects a most favorable policy, and selects an inter-domain communication path by means of label information management.

The Internet system architecture provided in this embodiment of the present disclosure may be used to establish internetworks on different scales. One network architecture may have multiple different representation forms with reference to specific technologies. For example, the Internet system architecture provided in this embodiment of the present disclosure may be constructed based on a traditional optical waveguide technology, or may be constructed using an atmospheric laser space communications technology in future.

The following describes in detail an inter-domain communication procedure that is based on the Internet system architecture provided in this embodiment of the present disclosure.

Figure 5:
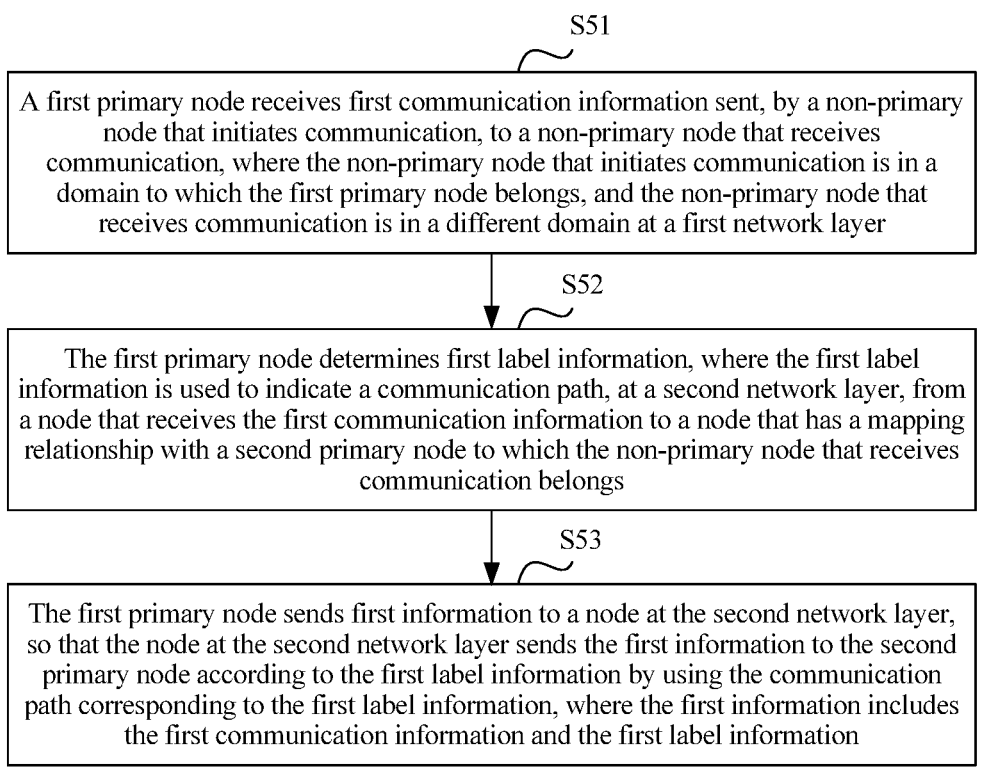
FIG. 5 is a schematic diagram of a first network communication method according to an embodiment of the present disclosure.

An embodiment of the present disclosure provides a network communication method on a side of a first primary node at a first network layer, and the method is applied to multi-layer network communication. As shown in FIG. 5, the method includes the following steps.

S51. The first primary node receives first communication information sent, by a non-primary node that initiates communication, to a non-primary node that receives communication, where the non-primary node that initiates communication is in a domain to which the first primary node belongs, and the non-primary node that receives communication is in a different domain at the first network layer.

S52. The first primary node determines first label information, where the first label information is used to indicate a communication path, at a second network layer, from a node that receives the first communication information to a node that has a mapping relationship with a second primary node to which the non-primary node that receives communication belongs.

The first label information indicates a communication path formed by nodes at the second network layer that transmit the first communication information.

S53. The first primary node sends first information to a node at the second network layer, so that the node at the second network layer sends the first information to the second primary node according to the first label information using the communication path corresponding to the first label information, where the first information includes the first communication information and the first label information.

The first primary node adds the first label information to the first communication information, to form the first information. A preferred implementation format of the first information may be:

| First label information | First communication information |

In this embodiment of the present disclosure, by means of label information management, an inter-domain communication path is selected, and inter-domain exchange/routing of communication information and fast network access are implemented, thereby reducing a network latency. Because control logic is distributed at a first network layer and a second network layer, only forwarding of communication information is implemented based on label information at the second network layer, which resolves a management bottleneck in large-scale deployment and accelerates a response speed of the control logic.

In implementation, that the first primary node determines first label information in S52 includes, if determining that a label processing rule table stored by the first primary node includes label information corresponding to the communication path, the first primary node determines the label information included in the label processing rule table as the first label information; or if determining that a label processing rule table stored by the first primary node does not include label information corresponding to the communication path, the first primary node sends the first communication information to a first domain controller to which the first primary node belongs, and determines label information returned by the first domain controller as the first label information.

It should be noted that each domain at the first network layer has at least one domain controller, and each domain controller controls at least one primary node. The domain controller is configured to select, from the second network layer according to control information released by the second network layer, a communication path for communication between a non-primary node in a domain to which the domain controller belongs and a non-primary node in another domain, and allocate label information to the communication path.

In implementation, content of an entry in the label processing rule table stored by the first primary node includes information about a non-primary node that sends communication information and information about a non-primary node that receives the communication information, and the first label information corresponding to the communication path, at the second network layer, from the node that receives the first communication information to the node that has the mapping relationship with the second primary node to which the non-primary node that receives communication belongs. In a preferred implementation manner, content of each record in the label processing rule table stored by the first primary node includes a label column (which is used to indicate label information), a condition column (which is used to indicate a non-primary node that sends communication information and a non-primary node that receives the communication information), and an operation column (which is used to indicate an operation performed on information that meets the condition column or the label column). Certainly, the label processing rule table may be implemented in another manner.

For example, it is assumed that label information allocated by the first domain controller to a communication path is a label 9, where the communication path is selected for transmitting the first communication information from the non-primary node that initiates communication (an A-domain non-primary node 1 in the table) to the non-primary node that receives communication (a B-domain non-primary node 8 in the table), and in this case, the label processing rule table stored by the first primary node is shown in Table 1.

TABLE 1

| Label | Condition | Operation |
|-------|-----------|-----------|
| N/A | A-domain non-primary node 1 -> B-domain non-primary node 8 | Add the label 9 to data, and send the data to the second network layer |

If the first primary node determines, according to the label processing rule table in Table 1, that an operation "Add the label 9 to data, and send the data to the second network layer" is performed when a condition "A-domain non-primary node 1->B-domain non-primary node 8" is met, the first primary node sends the first information to the second network layer. The first information includes the first communication information and the first label information (that is, the label 9).

In implementation, after the first primary node sends the communication information to the first domain controller to which the first primary node belongs, the method further includes receiving, by the first primary node, label information that is allocated by the first domain controller to a communication path selected from the second network layer, where the selected communication path is from the node that receives the first communication information to the node that has the mapping relationship with the second primary node to which the non-primary node that receives communication belongs; and updating, according to the received label information, the label processing rule table stored by the first primary node.

After receiving the first information sent by the first primary node, the first domain controller selects, from the second network layer according to control information that is released by the second network layer and used to indicate a load status of each node at the second network layer, the communication path from the node that receives the first communication information to the node that has the mapping relationship with the second primary node to which the non-primary node that receives communication belongs; allocates the label information to the selected communication path; and sends the allocated label information to the first primary node.

When updating, according to the received label information, the label processing rule table stored by the first primary node, the first primary node may directly add, to the label processing rule table, a new entry used to represent the received label information, or may directly replace the received label information with a stored entry corresponding to the first label information that is corresponding to the communication path.

Based on any one of the foregoing embodiments, the method further includes receiving, by the first primary node, label information that is allocated by the first domain controller to which the first primary node belongs to a communication path reselected from the second network layer, where the reselected communication path is from the node that receives the first communication information to the node that has the mapping relationship with the second primary node to which the non-primary node that receives communication belongs; and updating, according to the received label information, the label processing rule table stored by the first primary node.

After receiving the control information that is released by the second network layer and used to indicate the load status of each node at the second network layer, if determining, according to the control information, that the communication path needs to be updated, the first domain controller reselects, from the second network layer, the communication path from the node that receives the first communication information to the node that has the mapping relationship with the second primary node to which the non-primary node that receives communication belongs; allocates the label information to the reselected communication path; and sends the allocated label information to the first primary node.

After receiving control information that is currently released by the second network layer and used to represent a network load status of the second network layer, the first domain controller determines, according to the control information currently released by the second network layer, whether the selected communication path needs to be updated, and if the selected communication path needs to be updated, reselects a communication path, and allocates new label information to the reselected communication path; if the selected communication path does not need to be updated, performs no processing.

For example, if it is assumed that a label allocated by the first domain controller to the reselected communication path is a label 9', the label processing rule table obtained after the first primary node performs the update is shown in Table 2.

TABLE 2

| Label | Condition | Operation |
|-------|-----------|-----------|
| N/A | A-domain non-primary node 1 -> B-domain non-primary node 8 | Add the label 9' to data, and send the data to the second network layer |

In this embodiment of the present disclosure, each domain at the first network layer is corresponding to at least one domain controller. To distinguish a domain controller corresponding to a domain in which a non-primary node that sends communication information is located from a domain controller corresponding to a domain in which a non-primary node that receives the communication information is located, a first domain controller and a second domain controller are used in this embodiment of the present disclosure, but no limitation is constituted to a quantity of domain controllers and operation priorities of the domain controllers. Each domain controller at the first network layer is responsible for managing a label of data traffic of a primary node in a domain to which the domain controller belongs, selecting a communication path for inter-domain communication from the second network layer according to received control information released by the second network layer, and allocating corresponding label information, so as to select a path for inter-domain communication using label information added to communication information.

Based on any one of the foregoing embodiments, the first label information has the following four implementation manners.

Manner A: The first label information includes encoding information of each node in the communication path, at the second network layer, from the node that receives the first communication information to the node that has the mapping relationship with the second primary node.

Figure 6:
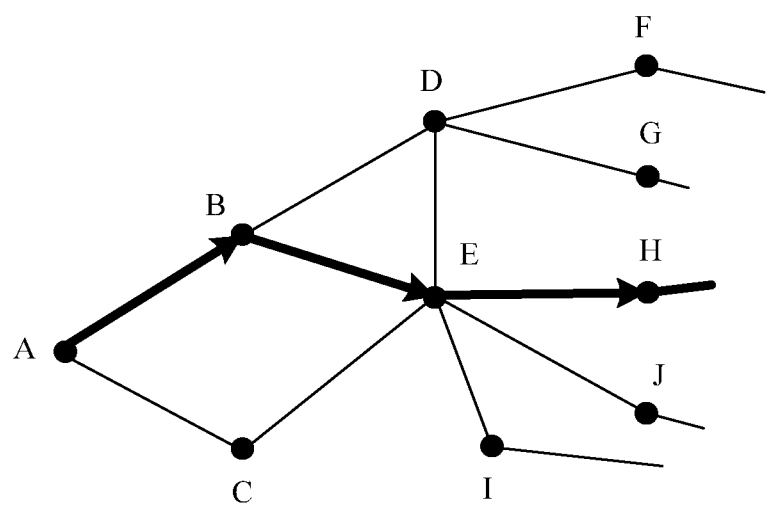
FIG. 6 is a schematic diagram of a first type of label information according to an embodiment of the present disclosure.

For example, as shown in FIG. 6, if it is assumed that a communication path, at the second network layer, for transmitting the first communication information passes through nodes A, B, E, and H, the first label information determined by the first primary node is a combination of encoding information of all the nodes that the communication path passes through, that is, ABEH. In this way, the second network layer may perform mechanical forwarding according to the communication path indicated by the first label information. Because an entire forwarding process only relates to a label, but does not involve complex query and determining, scalability of the second network layer is better.

Manner B: The first label information includes encoding information of a link between nodes in the communication path, at the second network layer, from the node that receives the first communication information to the node that has the mapping relationship with the second primary node.

Figure 7:
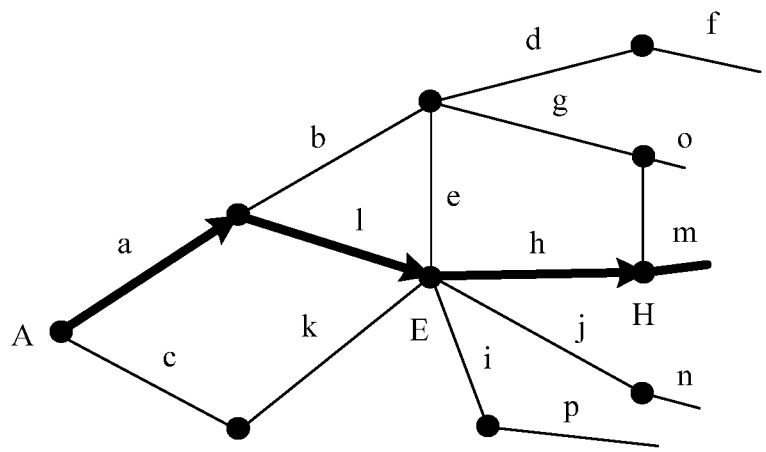
FIG. 7 is a schematic diagram of a second type of label information according to an embodiment of the present disclosure.

For example, as shown in FIG. 7, if it is assumed that links that a communication path, at the second network layer, for transmitting the first communication information passes through include a link a, a link l, a link h, and a link m, the first label information determined by the first primary node is a combination of encoding information of the links that the communication path passes through, that is, alhm.

Manner C: The first label information includes encoding information of a port of each node in the communication path, at the second network layer, from the node that receives the first communication information to the node that has the mapping relationship with the second primary node.

Figure 8:
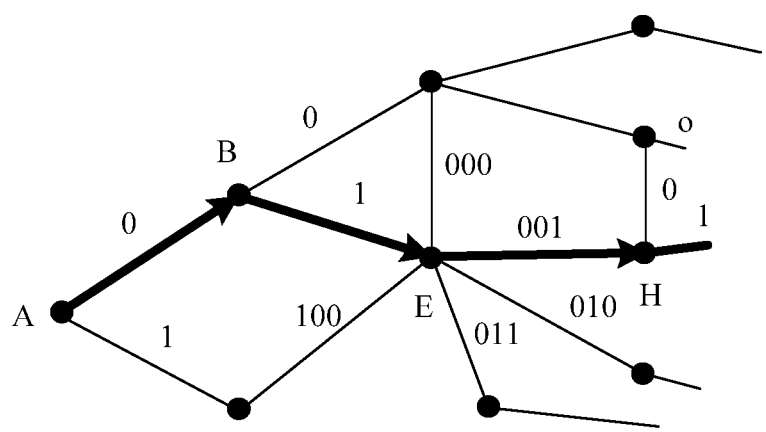
FIG. 8 is a schematic diagram of a third type of label information according to an embodiment of the present disclosure.

For example, as shown in FIG. 8, it is assumed that a communication path, at the second network layer, for transmitting the first communication information passes through nodes A, B, E, and H. The node A includes two ports, where the two ports of the node A each can be identified using one bit, that is, 0 represents one port, and 1 represents the other port of the node A, and the node A forwards the first communication information using the port 0. Similarly, the node B includes two ports, and forwards the first communication information using a port 1. The node E includes five ports, where the ports of the node E each are identified using three bits, and the node E forwards the first communication information using a port 001. The node H includes two ports, and forwards the first communication information using a port 1. In this case, the first label information determined by the first primary node is a combination of encoding information of ports, of the nodes that the communication path passes through, for forwarding the communication information, that is, 01001. It can be learned that only five bits are required for describing a communication path "A→B→E→H", and label information of only one bit to three bits needs to be queried for each time of forwarding.

In this manner, a port number of each node at the second network layer is agreed on in advance, that is, an understanding of the port number of each node need to be consistent at the first network layer and the second network layer.

In the foregoing Manner A to Manner C, route selection and route calculation are completed by each domain controller at the first network layer, and the first label information includes complete information that is about a communication path and forwarded by the second network layer.

In the foregoing Manner A to Manner C, label information is allocated to an end-to-end communication path based on a source routing mechanism. In the source routing mechanism, a controller corresponding to the second network layer performs abstract processing on network topology information of the second network layer, and then sends the processed network topology information to each domain controller at the first network layer. Each domain controller at the first network layer calculates a specific communication path for each pair of end-to-end communication according to the network topology information of the second network layer with reference to a local communication requirement; and after obtaining the communication path, uses, as label information corresponding to the communication path, identification information for identifying the communication path, adds the label information to corresponding communication information, and sends the corresponding communication information to the second network layer.

Figure 9:
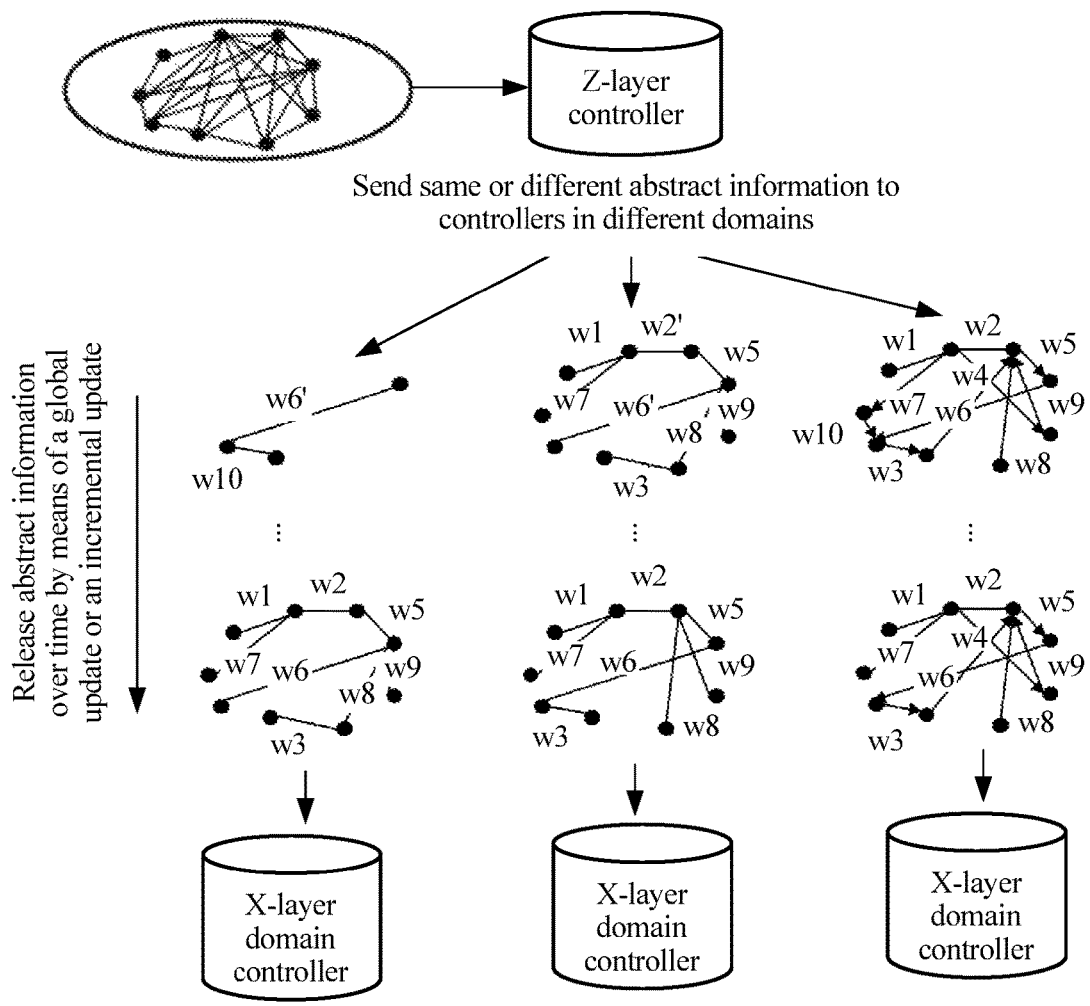
FIG. 9 is a schematic diagram of a control information release mechanism according to an embodiment of the present disclosure.

As shown in FIG. 9, a controller at the second network layer (a Z layer) sends network topology information of the Z layer to each domain controller at the first network layer (an X layer) in a form of a directed graph or an undirected graph, and guides traffic in different domains by dynamically adjusting an edge weight. First, the Z-layer controller releases different network topology information to different domains at the X layer, to implement traffic isolation in the different domains in terms of a path selection range. The Z-layer controller performs real-time traffic guidance and control on link resources shared by multiple domains. With reference to a real-time network traffic status, the Z-layer controller gradually increases a weight of a high-load link and decreases a weight of a low-load link; and may further distribute and schedule network traffic in cooperation with each domain controller at the X layer using a routing method in which a total link weight is the lowest, thereby improving overall network efficiency.

Manner D: The first label information includes location coordinate information and routing direction information that are of the node that is at the second network layer and receives the first communication information and the node that is at the second network layer and has the mapping relationship with the second primary node.

This manner is implemented based on topology information of a rule network (where the rule network means that a network topology is easily described using brief language. For example, a network described using a 4×4×4 cube is a rule network, and connection relationships between 64 nodes in the network do not need to be described in turn) at the second network layer. The rule network makes description of a specific path for broadcasting and routing the topology information much easier. Due to a network rule characteristic of the rule network, the network topology information of the second network layer released by a controller at the second network layer to each domain at the first network layer may be simplified as an abstract description or coordinate information. Based on a routing policy agreed on in advance, label information may be simplified as a combination of coordinate information and the routing policy (that is, routing direction information) that are of a source node and a destination node.

For example, as shown in FIG. 10, a communication path from a point a (2, 1, 0) to a point d (1, 2, 1) may be obtained according to different coordinate convergence orders. In an example of a path routing order shown in FIG. 10, a communication path obtained based on a routing policy of a "yxz" order is: a (2, 1, 0)->b (2, 2, 0)->c (1, 2, 0)->d (1, 2, 1). A path obtained based on a routing policy of an "xyz" order is: a (2, 1, 0)->b (1, 1, 0)->c (1, 2, 0)->d (1, 2, 1). Each domain at the first network layer may avoid a busy link by flexibly selecting routing policies of different orders using label information, so as to implement dynamic load balancing of global network traffic, and optimize network performance. In this manner, a routing policy of a communication path selected by the first network layer is agreed on in advance, that is, an understanding of the routing policy of the communication path need to be consistent at the first network layer and the second network layer.

For example, routing direction information may be represented using bit information. For example, the routing direction information is represented using three-bit information, where 000 represents a routing direction xyz, 001 represents a routing direction xzy, 010 represents a routing direction yxz, 011 represents a routing direction yzx, and the like, provided that an understanding of routing direction information of a communication path is consistent at the first network layer and the second network layer.

In this manner, a network rule characteristic of the second network layer is utilized, which reduces overheads of control information and label information.

Based on a same disclosure concept, an embodiment of the present disclosure provides a network communication method on a side of a second primary node at a first network layer. As shown in FIG. 11, the method includes the following steps.

S111. The second primary node at the first network layer receives first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the second primary node belongs, the non-primary node that receives communication is in the domain to which the second primary node belongs, and the first label information is used to indicate a communication path, at the second network layer, from a node that receives the first communication information to a node that has a mapping relationship with the second primary node.

S112. The second primary node removes the first label information from the first information, and sends the first information obtained after the removing processing to the non-primary node that receives communication.

For a specific implementation manner of the first label information, refer to the description on the side of the foregoing first primary node. Details are not described herein again.

In implementation, that the second primary node removes the first label information from the first information, and sends the first information obtained after the removing processing to the non-primary node that receives communication in S112 includes the second primary node processes the first information according to a processing rule that is in a label processing rule table stored by the second primary node and that is used to instruct to process the first information including the first label information, where the processing rule instructs to remove the first label information from the first information, and send the first information obtained after the removing processing to the non-primary node that receives communication.

That the second primary node processes the first information according to a processing rule that is in a label processing rule table stored by the second primary node and that is used to instruct to process the first information including the first label information includes, if the second primary node determines that the label processing rule table stored by the second primary node includes a processing rule that is used to instruct to process the first information including the first label information, the second primary node processes the first information according to the processing rule included in the label processing rule table; or if the second primary node determines that the label processing rule table stored by the second primary node does not include a processing rule that is used to instruct to process the first information including the first label information, the second primary node sends the first information to a second domain controller to which the second primary node belongs, and processes the first information according to a processing rule returned by the second domain controller.

In implementation, after the second primary node sends the first information to the second domain controller to which the second primary node belongs, the method further includes receiving, by the second primary node, a processing rule configured by be second domain controller for the first information, and updating, according to the received processing rule, the label processing rule table stored by the second primary node. After receiving the first information sent by the second primary node, the second domain controller configures the processing rule for the first information, so as to instruct to remove the first label information from the first information, and send the first information obtained after the removing processing to the non-primary node that receives communication.

In implementation, the method further includes receiving, by the second primary node, second label information sent by the second domain controller, and updating, according to the received second label information, the label processing rule table stored by the second primary node, where the second label information is used to indicate a communication path, at the second network layer, from a node that receives second communication information to a node that has a mapping relationship with the first primary node, and the second communication information is sent from the non-primary node that receives communication to the non-primary node that sends communication.

After receiving the first information sent by the second sending module, the second domain controller selects, from the second network layer according to control information that is released by the second network layer and used to indicate a load status of each node at the second network layer, the communication path from the node that receives the second communication information to the node that has the mapping relationship with the first primary node; allocates the second label information to the selected communication path; and sends the second label information to the second primary node.

For example, if it is assumed that the second label information allocated by the second domain controller is a label 10, the label processing rule table obtained after the second primary node performs the update is shown in Table 3.

TABLE 3

| Label | Label condition | Operation |
|---|---|---|
| N/A | B-domain non-primary node 8 -> A-domain non-primary node 1 | Add the label 10 to data, and send the data to the second network layer |
| 9 | N/A | Remove a label from data, and send the data to the second primary node |

In Table 3, a first record includes the second label information allocated by the second domain controller, and a second record includes the processing rule configured by the second domain controller for the first information.

In implementation, the method further includes receiving, by the second primary node, second label information that is allocated by the second domain controller to a communication path reselected for transmitting the second communication information, and updating, according to the received second label information, the label processing rule table stored by the second primary node.

After receiving the control information that is released by the second network layer and used to indicate the load status of each node at the second network layer, if determining, according to the control information, that the communication path, at the second network layer, from the node that receives the second communication information to the node that has the mapping relationship with the first primary node needs to be updated, the second domain controller reselects, from the second network layer, the communication path from the node that receives the second communication information to the node that has the mapping relationship with the first primary node; allocates the second label information to the reselected communication path; and sends the allocated second label information to the second primary node.

After receiving control information that is currently released by the second network layer and used to represent a network load status of the second network layer, the second domain controller determines, according to the control information currently released by the second network layer, whether the communication path, at the second network layer, for transmitting the second communication information needs to be updated, and if the communication path, at the second network layer, for transmitting the second communication information needs to be updated, reselects a communication path, and allocates new second label information to the reselected communication path; if the communication path, at the second network layer, for transmitting the second communication information does not need to be updated, performs no processing.

For example, if it is assumed that the second label information allocated by the second domain controller to the reselected communication path is a label 10', the label processing rule table obtained after the second primary node performs the update is shown in Table 4.

TABLE 4

| Label | Label condition | Operation |
|-------|-----------------|-----------|
| N/A | B-domain non-primary node 8 -> A-domain non-primary node 1 | Add the label 10' to data, and send the data to the second network layer |
| 9 | N/A | Remove a label from data, and send the data to the second primary node |
| 9' | N/A | Remove a label from data, and send the data to the second primary node |

Based on any one of the foregoing embodiments, the second label information includes encoding information of each node in the communication path, at the second network layer, from the node that receives the second communication information to the node that has the mapping relationship with the first primary node; or encoding information of a link between nodes in the communication path, at the second network layer, from the node that receives the second communication information to the node that has the mapping relationship with the first primary node; or encoding information of a port of each node in the communication path, at the second network layer, from the node that receives the second communication information to the node that has the mapping relationship with the first primary node; or location coordinate information and preset routing direction information that are of the node that is at the second network layer and receives the second communication information and the node that is at the second network layer and has the mapping relationship with the first primary node.

Figure 12:
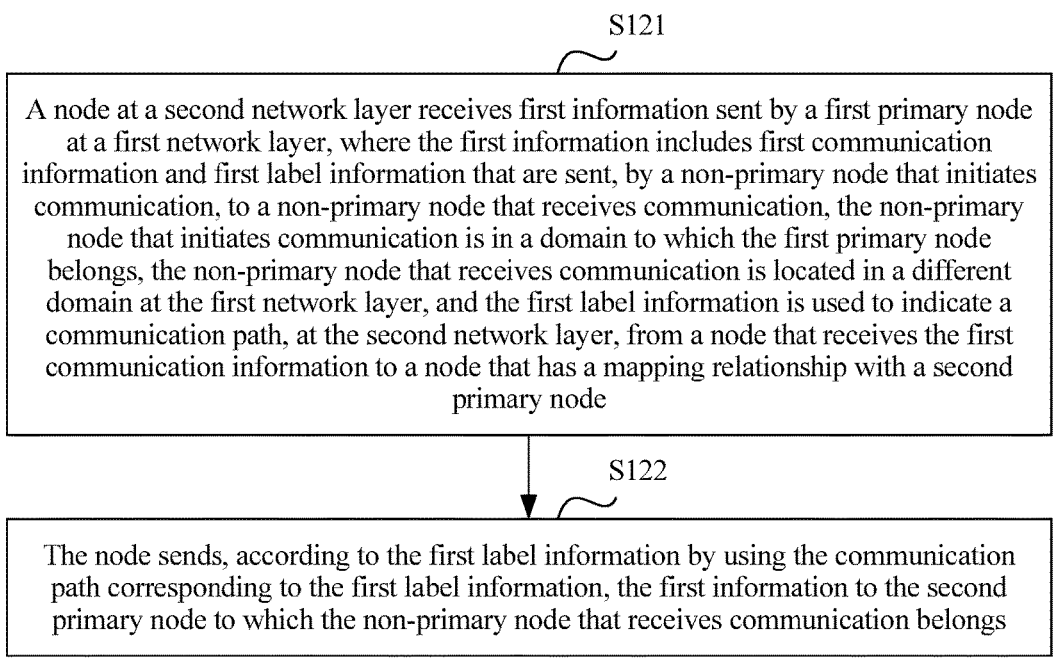
FIG. 12 is a schematic diagram of a third network communication method according to an embodiment of the present disclosure.
Figure 13A:
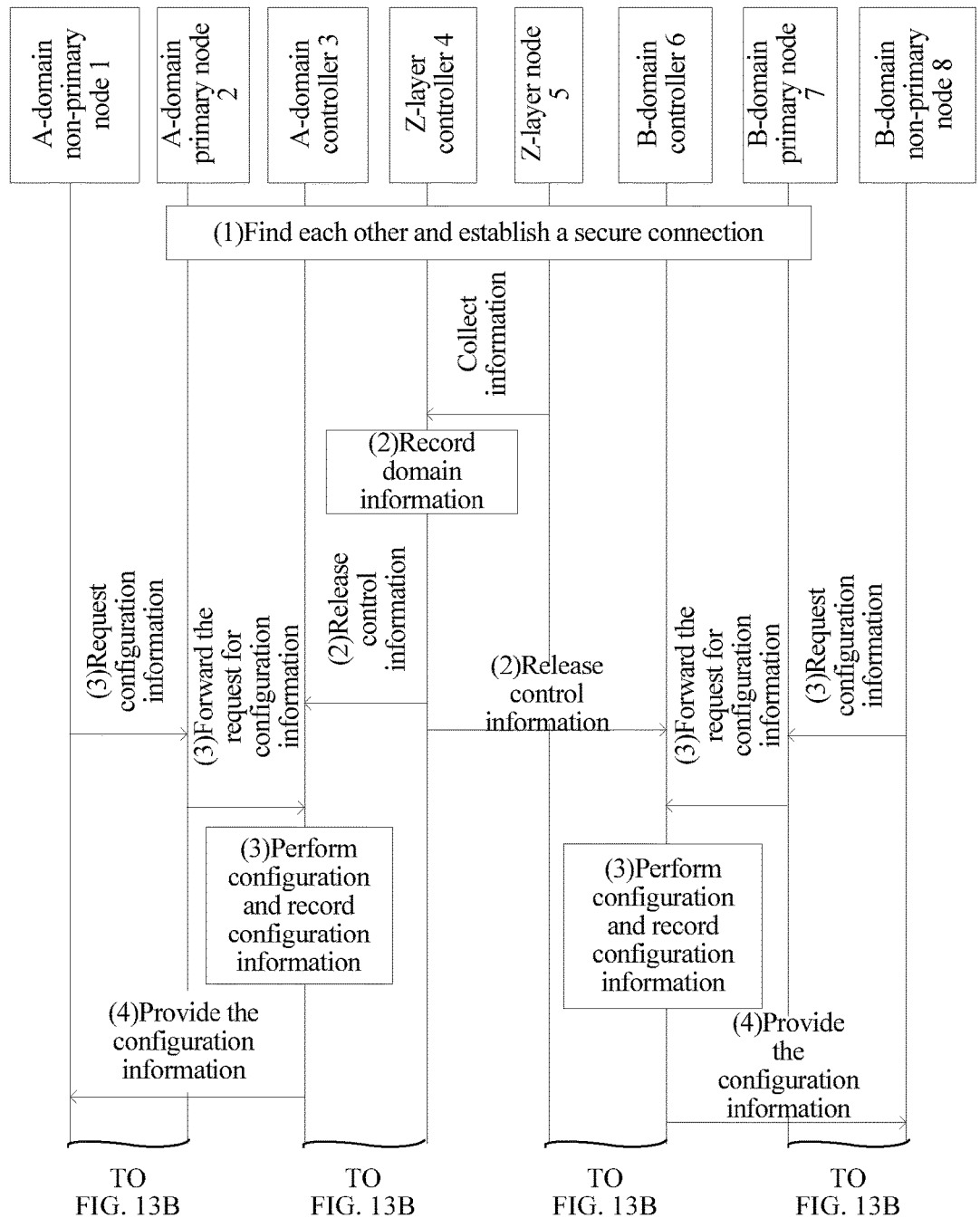
FIG. 13A, FIG. 13B, FIG. 13C, and FIG. 13D are a schematic flowchart of Embodiment 1 according to an embodiment of the present disclosure.
Figure 13B:
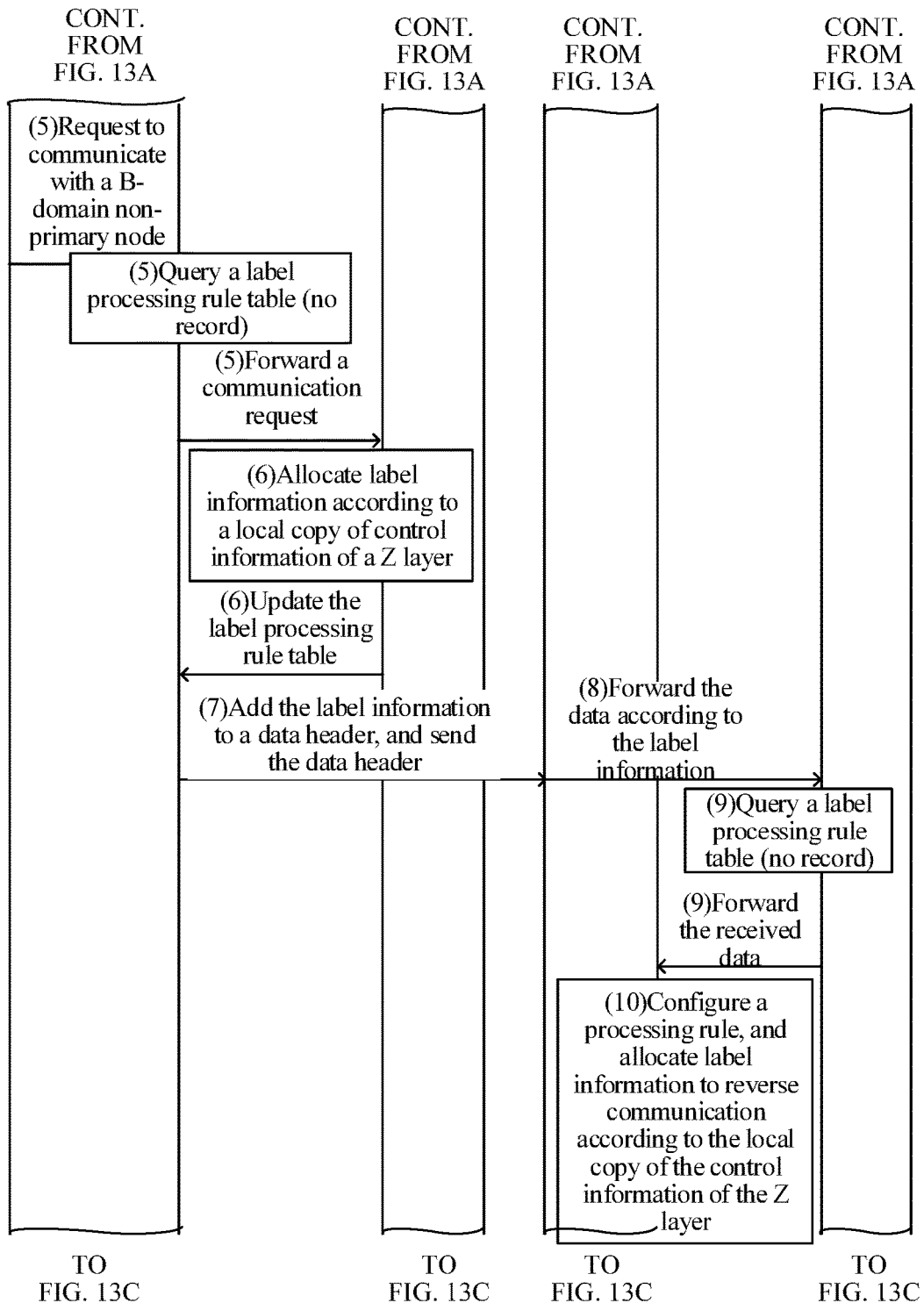
Figure 13C:
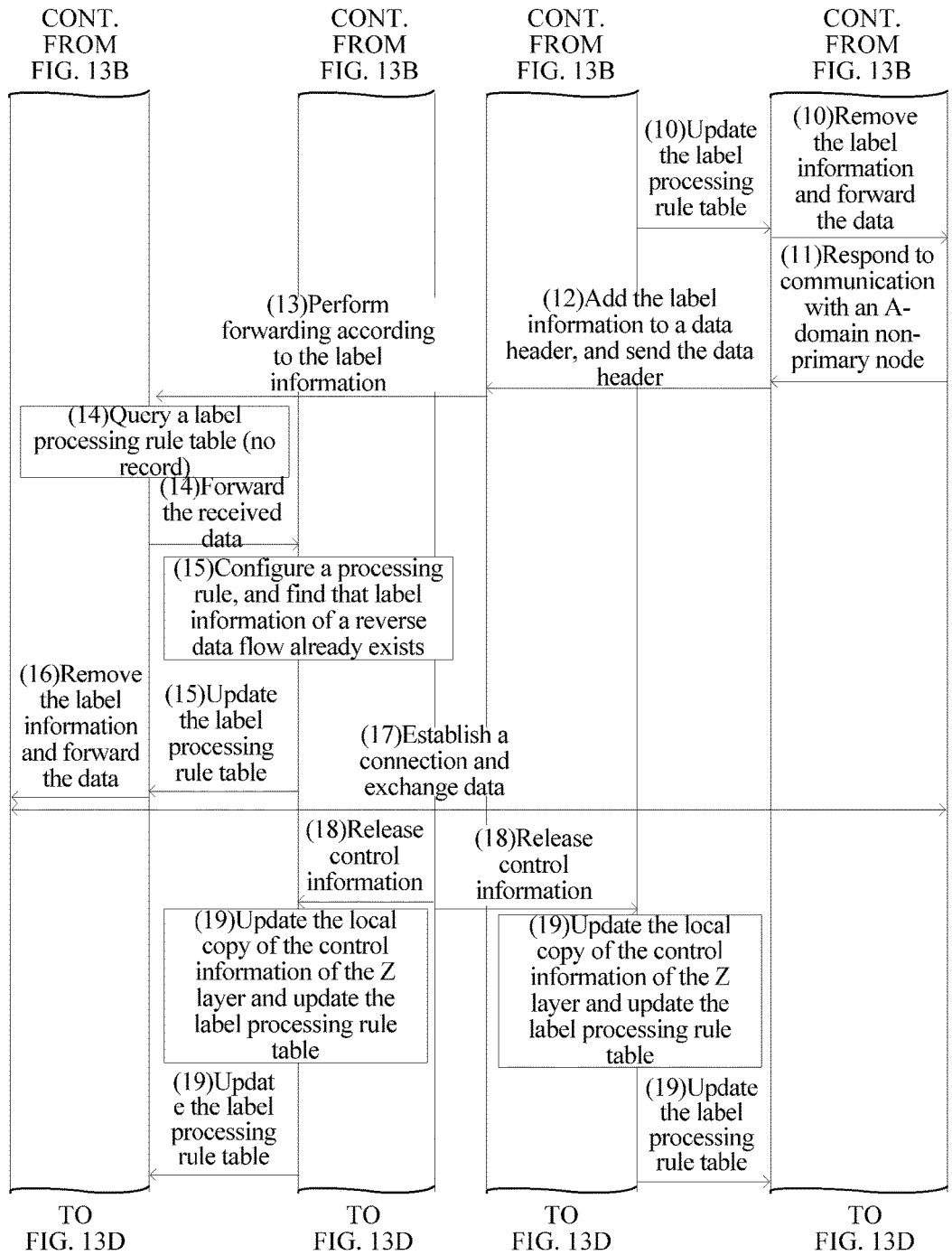
Figure 13D:
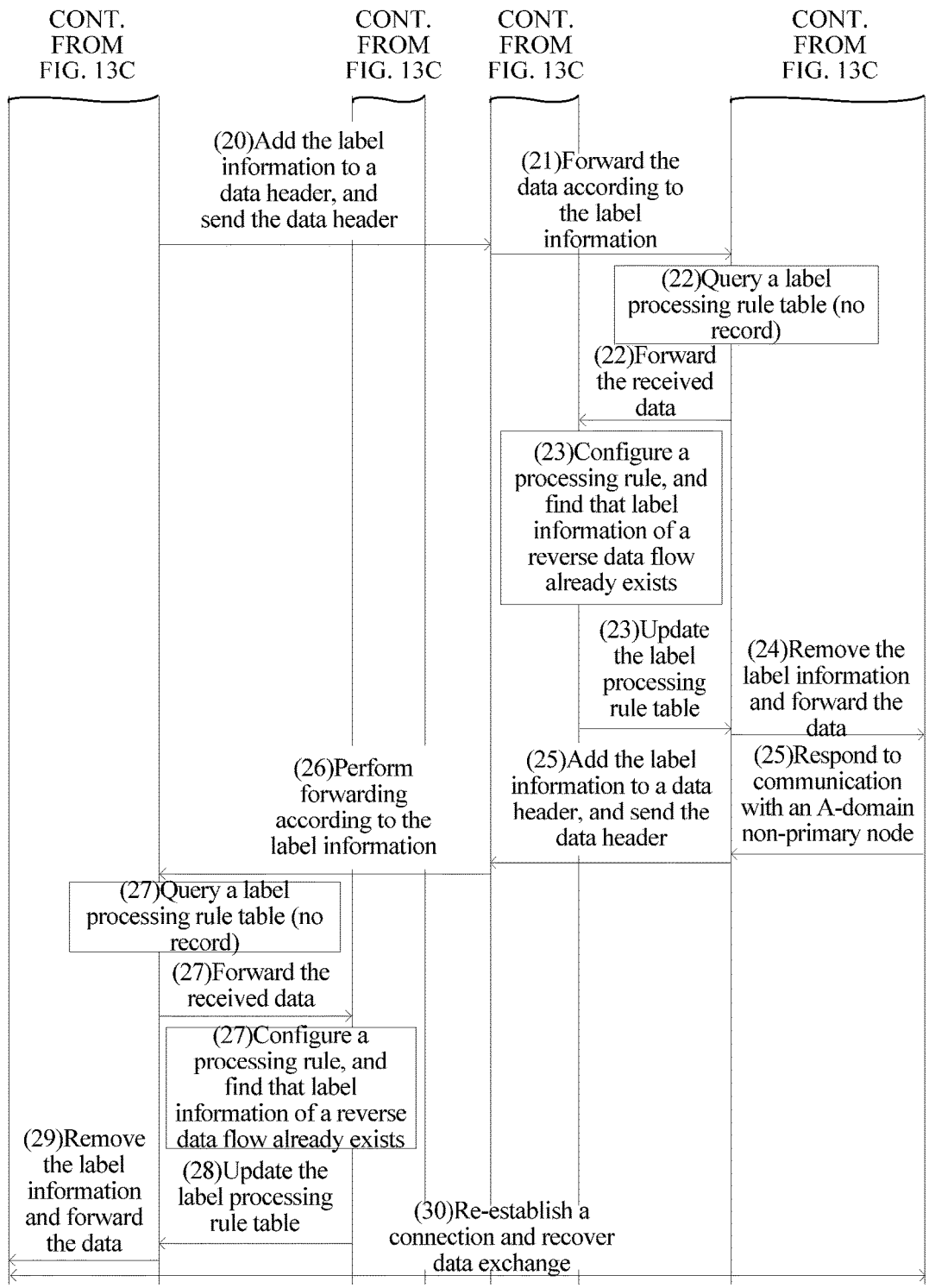

Based on a same disclosure concept, an embodiment of the present disclosure provides a network communication method on a side of a node at a second network layer, and the method is applied to multi-layer communication. As shown in FIG. 12, the method includes the following steps.

S121. The node at the second network layer receives first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with the second primary node.

S122. The node sends, according to the first label information using the communication path corresponding to the first label information, the first information to the second primary node to which the non-primary node that receives communication belongs.

For a specific implementation manner of the first label information, refer to the description on the side of the foregoing first primary node. Details are not described herein again.

The following describes, in detail in terms of interaction between network layers in an Internet system with reference to specific embodiments, the network communication method provided in this embodiment of the present disclosure.

Embodiment 1

It is assumed that there are two non-primary nodes (which are marked as a non-primary node 1 and a non-primary node 8) at a first network layer, and the two non-primary nodes are respectively located in two independent domains (which are marked as a domain A and a domain B) at the first network layer. In the domain A and the domain B, there are two primary nodes (which are marked as an A-domain primary node 2 and a B-domain primary node 7), and domain controllers (which are marked as an A-domain controller 3 and a B-domain controller 6) corresponding to the domain A and the domain B. The A-domain primary node 2 and the B-domain primary node 7 are connected to a same second network layer (which is marked as a Z layer 5), and the second network layer has a Z-layer controller 4. As shown in FIG. 13A, FIG. 13B, FIG. 13C, and FIG. 13D, the network communication method is as follows:

(1) At a system initialization stage, the A-domain controller 3, the B-domain controller 6, and the Z-layer controller 4 find each other using a spanning tree (spanning tree), and reliable communication connections are established between the A-domain controller 3 and the Z-layer controller 4, and between the B-domain controller 6 and the Z-layer controller 4.

(2) After collecting control information that is of the Z layer 5 and used to indicate a load status of each node at the second network layer, the Z-layer controller 4 releases the control information to all domain controllers (which are the A-domain controller 3 and the B-domain controller 6 in this embodiment) by means of the reliable communication connections established in step (1), and records related domain information.

(3) The A-domain non-primary node 1 requests configuration information from the A-domain primary node 2, the A-domain primary node 2 forwards the request to the A-domain controller 3, and the A-domain controller 3 performs configuration on the A-domain non-primary node 1 according to a local copy of the control information that is of the Z layer and obtained in step (2), and records configuration information of the non-primary node.

(4) The B-domain non-primary node 8 obtains configuration information from the B-domain controller 6 according to step (3), and records information about the node.

(5) The A-domain non-primary node 1 initiates a communication request to the B-domain non-primary node 8, where a data flow passes through the A-domain primary node 2, and the A-domain primary node 2 queries a local label processing rule table according to "A-domain non-primary node 1->B-domain non-primary node 8", but does not find a related record, and therefore, the A-domain primary node 2 forwards the communication request to the A-domain controller 3.

(6) The A-domain controller 3 allocates a label to the communication request according to the local copy of the control information that is of the Z layer and obtained in step (2), and updates the label processing rule table on the A-domain primary node 2.

In this case, content of the label processing rule table on the A-domain primary node 2 is as follows:

| Label | Condition | Operation |
|---|---|---|
| N/A | A-domain non-primary node 1 -> B-domain non-primary node 8 | Add a label 9 to data, and send the data to the Z layer 5 |

(7) The A-domain primary node 2 adds the label 9 to all data of "A-domain Non-primary node 1->B-domain non-primary node 8" according to the updated label processing rule table, and sends the data to the Z layer 5.

(8) The Z layer 5 rapidly forwards the data according to the label, so that the data of "A-domain non-primary node 1->B-domain non-primary node 8" and the label 9 arrive at the B-domain primary node 7.

(9) The B-domain primary node 7 queries a local label processing rule table, but does not find a processing rule corresponding to the label 9, and therefore, the B-domain primary node 7 forwards the received information to the B-domain controller 6.

(10) The B-domain controller 6 allocates a label 10 to reverse communication "B-domain non-primary node 8->A-domain non-primary node 1" according to the local copy of the control information that is of the Z layer and obtained in (2) and information about the label 9, and configures a processing rule for the label 9; and the B-domain controller 6 forwards the foregoing content to the B-domain primary node 7.

In this case, content of the label processing rule table on the B-domain primary node 7 is as follows:

| Label | Label condition | Operation |
|---|---|---|
| N/A | B-domain non-primary node 8 -> A-domain non-primary node 1 | Add the label 10 to data, and send the data to the Z layer 5 |
| 9 | N/A | Remove a label from data, and send the data to the B-domain non-primary node 8 |

(11) The B-domain primary node 7 sends the data of "A-domain non-primary node 1->B-domain non-primary node 8" to the B-domain non-primary node 8.

(12) The B-domain non-primary node 8 gives a response, and when a data flow of "B-domain non-primary node 8->A-domain non-primary node 1" passes through the B-domain primary node 7, the label 10 is added to the data, and the data is sent to the Z layer 5.

(13) The Z layer 5 rapidly forwards the data according to the label 10, so that the data of "B-domain non-primary node 8->A-domain non-primary node 1" and the label 10 arrive at the A-domain primary node 2.

(14) The A-domain primary node 2 queries the local label processing rule table, but does not find a processing rule corresponding to the label 10, and therefore, the A-domain primary node 2 forwards the received information to the A-domain controller 3.

(15) The A-domain controller 3 allocates a label to reverse communication "A-domain non-primary node 1->B-domain non-primary node 8" according to the local copy of the control information that is of the Z layer and obtained in (2) and the label 10, and finds that the label 9 already exists, and therefore, the A-domain controller 3 does not perform processing, or performs overwriting and configures a processing rule for the label 10; and the A-domain controller 3 forwards the foregoing content to the A-domain primary node 2. In this case, content of the label processing rule table on the A-domain primary node 2 is as follows:

| Label | Condition | Operation |
|---|---|---|
| N/A | "A-domain non-primary node 1 -> B-domain non-primary node 8" | Add the label 9 to data, and send the data to the Z layer 5 |
| 10 | N/A | Remove a label from data, and send the data to the A-domain non-primary node 1 |

(16) The A-domain primary node 2 sends communication information of "B-domain non-primary node 8->A-domain non-primary node 1" to the A-domain non-primary node 1.

(17) Establish bidirectional communication between the A-domain non-primary node 1 and the B-domain non-primary node 8.

The following further analyzes a communication recovery procedure in a case of a label update, and the procedure is as follows.

(18) In a process of communication between the A-domain non-primary node 1 and the B-domain non-primary node 8, the Z-layer controller 4 releases control information of the Z layer to the A-domain controller 3 and the B-domain controller 6 according to real-time information of the Z layer 5.

(19) Because the control information of the Z layer changes, the labels 9 and 10 need to be updated, and it is assumed that the updated labels are a label 9' and a label 10'. In this case, content of the label processing rule table on the A-domain primary node 2 is as follows:

| Label | Condition | Operation |
|---|---|---|
| N/A | A-domain non-primary node 1 -> B-domain non-primary node 8 | Add the label 9' to data, and send the data to the Z layer 5 |
| 10 | N/A | Remove a label from data, and send the data to the A-domain non-primary node 1 |

Content of the label processing rule table on the B-domain primary node 7 is as follows:

| Label | Condition | Operation |
|---|---|---|
| N/A | B-domain non-primary node 8 -> A-domain non-primary node 1 | Add the label 10' to data, and send the data to the Z layer 5 |
| 9 | N/A | Remove a label from data, and send the data to the B-domain non-primary node 8 |

(20) The A-domain primary node 2 adds the label 9' to all the data of "A-domain non-primary node 1->B-domain non-primary node 8" according to the updated label processing rule table, and sends the data to the Z layer 5.

21) The Z layer 5 rapidly forwards the data according to the label 9', so that the data of "A-domain non-primary node 1->B-domain non-primary node 8" and the label 9' arrive at the B-domain primary node 7.

(22) The B-domain primary node 7 queries the local label processing rule table, but does not find a processing rule corresponding to the label 9', and therefore, the B-domain primary node 7 forwards the information to the B-domain controller 6.

(23) The B-domain controller 6 sets a processing rule for the label 9' according to a local copy of the control information that is of the Z layer and obtained in (18) and the label 9; the B-domain controller 6 allocates a new label to reverse communication of "B-domain non-primary node 8->A-domain non-primary node 1", and because the label 10' already exists, the B-domain controller 6 does not perform processing, or overwrites original label information; and the B-domain controller 6 forwards the foregoing content to the B-domain primary node 7. In this case, content of the label processing rule table stored by the B-domain primary node 7 is as follows:

| Label | Condition | Operation |
|---|---|---|
| N/A | B-domain non-primary node 8 -> A-domain non-primary node 1 | Add the label 10' to data, and send the data to the Z layer 5 |
| 9 | N/A | Remove a label from data, and send the data to the B-domain non-primary node 8 |
| 9' | N/A | Remove a label from data, and send the data to the B-domain non-primary node 8 |

(24) The B-domain primary node 7 sends the data of "A-domain non-primary node 1->B-domain non-primary node 8" to the B-domain non-primary node 8.

(25) The B-domain non-primary node 8 gives a response, and when the data flow of "B-domain non-primary node 8->A-domain non-primary node 1" passes through the B-domain primary node 7, the label 10' is added to the data, and the data is sent to the Z layer 5.

(26) The Z layer 5 rapidly forwards the data according to the label 10', so that the data of "B-domain non-primary node 8->A-domain non-primary node 1" and the label 10' arrive at the A-domain primary node 2.

(27) The A-domain primary node 2 queries the local label processing rule table, but does not find a processing rule corresponding to the label 10', and therefore, the A-domain primary node 2 forwards the received data to the A-domain controller 3.

(28) The A-domain controller 3 allocates a label to reverse communication "A-domain non-primary node 1->B-domain non-primary node 8" according to the local copy of the control information that is of the Z layer and obtained in (18) and information about the label 10', and finds that the label 9' already exists, and therefore, the A-domain controller 3 does not perform processing, or overwrites original label information and configures a processing rule for the label 10'; and the A-domain controller 3 forwards the foregoing content to the A-domain primary node 2. In this case, content of the label processing rule table on the A-domain primary node 2 is as follows:

| Label | Condition | Operation |
|---|---|---|
| N/A | A-domain non-primary node 1 -> B-domain non-primary node 8 | Add the label 9' to data, and send the data to the Z layer 5 |
| 10 | N/A | Remove a label from data, and send the data to the A-domain non-primary node 1 |
| 10' | N/A | Remove a label from data, and send the data to the A-domain non-primary node 1 |

(29) The A-domain primary node 2 sends the data of "B-domain non-primary node 8->A-domain non-primary node 1" to the A-domain non-primary node 1.

(30) Recover bidirectional communication between the A-domain non-primary node 1 and the B-domain non-primary node 8.

The A-domain primary node 2 and the B-domain primary node 7 preliminarily eliminate timeout entries in the label processing rule tables over time, that is, only an entry corresponding to updated label information is reserved.

After a period of time, content of the label processing rule table on the A-domain primary node 2 changes to:

| Label | Condition | Operation |
|---|---|---|
| N/A | A-domain non-primary node 1 -> B-domain non-primary node 8 | Add the label 9' to data, and send the data to the Z layer 5 |
| 10' | N/A | Remove a label from data, and send the data to the A-domain non-primary node 1 |

Content of the label processing rule table on the B-domain primary node 7 changes to:

| Label | Condition | Operation |
|---|---|---|
| N/A | B-domain non-primary node 8 -> A-domain non-primary node 1 | Add the label 10' to data, and send the data to the Z layer 5 |
| 9' | N/A | Remove a label from data, and send the data to the B-domain non-primary node 8 |

By comparison, a biggest difference between an existing OpenFlow communication procedure and the solution provided in this embodiment of the present disclosure lies in a communication path generation and management mechanism. In OpenFlow, a new flow needs to be established using a controller. After selecting a path, the controller performs configuration on all nodes in the communication path, so as to modify a form of a flow table on each node to establish a link. After the link is established, data is transmitted on the link, where link configuration is prior to data transmission of a specific flow. However, in an ICON solution provided in this embodiment of the present disclosure, the second network layer completely depends on label information of transmitted data, and no dynamic configuration is required at the second network layer. Link establishment is completely determined by a domain controller itself at the first network layer according to control information released by the second network layer, where the controller initiates a connection. For communication link establishment, no configuration is required to be performed on a node on the link. Using this feature, a new architecture is much better in terms of a communication establishment speed than a traditional SUN architecture represented by the OpenFlow, which significantly accelerates an end-to-end communication connection establishment speed. In addition, a performance bottleneck of centralized control in a traditional SDN network is overcome using a distributed characteristic of a domain.

Embodiment 2

Figure 14:
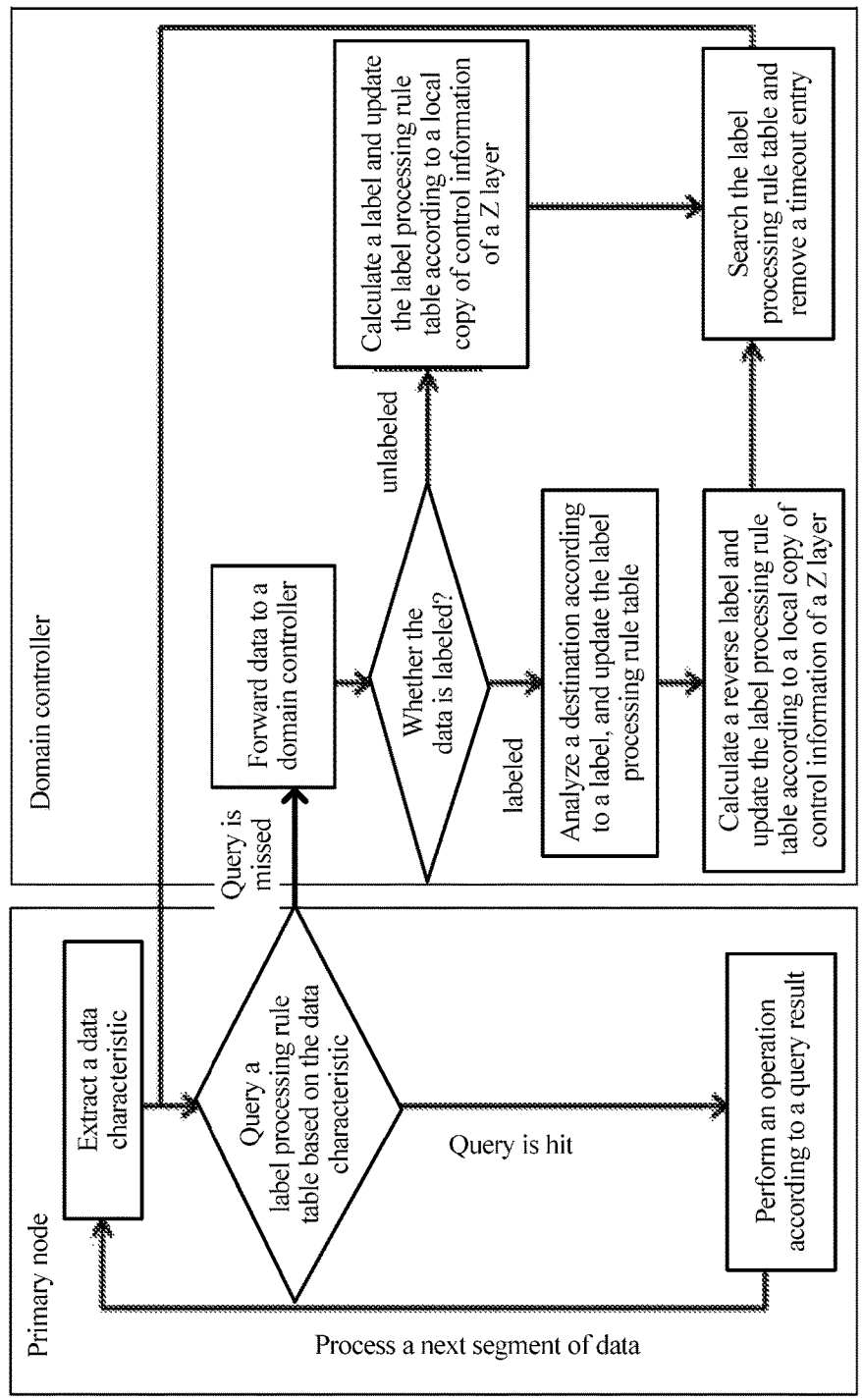
FIG. 14 is a schematic flowchart of Embodiment 2 according to an embodiment of the present disclosure.

In this embodiment, control logic of a first network layer is described. As shown in FIG. 14, a primary node at the first network layer and a domain controller to which the primary node belongs perform the following processing.

1. On a side of the primary node, after data information sent by a non-primary node in the domain to which the primary node belongs or sent by a second network layer is received, extracting a data characteristic of the data information, that is, learning a flow direction (that is, a sender and a receiver) of the data information; and querying, based on the data characteristic, a label processing rule table stored by the primary node, and if the query is hit (that is, the label processing rule table includes label information corresponding to the data characteristic), performing a corresponding operation according to a query result; or if the query is missed (that is, the label processing rule table does not include label information corresponding to the data characteristic), sending the data information to the domain controller to which the primary node belongs; where performing the corresponding operation by the primary node according to the query result includes adding corresponding label information to the data information, and sending the data information to the second network layer; or removing label information from the data information, and sending the data information to the non-primary node.

2. On a side of the domain controller, after it is determined that the data information sent by the primary node is received, first determining whether the data information is labeled (that is, whether the data information includes the label information); and if the data information is labeled, analyzing a destination according to the included label information, configuring a processing rule for the label information, and updating the label processing rule table on the primary node, and further, allocating label information to reverse communication according to a local copy of control information of the second network layer (a Z layer), and updating the label processing rule table on the primary node; or if the data information is unlabeled, allocating label information to a communication path of the data information according to a local copy of control information of the second network layer (a Z layer), and updating the label processing rule table on the primary node.

In a preferred implementation manner, the domain controller periodically searches the label processing rule table stored by the primary node, so as to remove a timeout entry.

Figure 15:
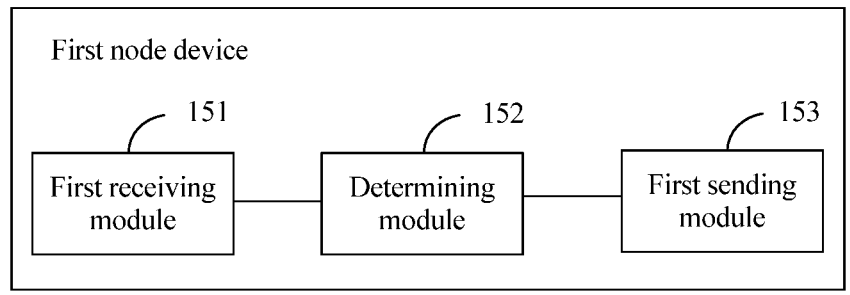
FIG. 15 is a schematic diagram of a first node device according to an embodiment of the present disclosure.

Based on a same disclosure concept, an embodiment of the present disclosure provides a first node device, and the node device is applied to multi-layer network communication. As shown in FIG. 15, the node device includes a first receiving module 151 configured to receive first communication information sent, by a non-primary node that initiates communication, to a non-primary node that receives communication, where the non-primary node that initiates communication is in a domain to which the first receiving module belongs, and the non-primary node that receives communication is in a domain at a first network layer different from the domain to which the first receiving module belongs; a determining module 152 configured to determine first label information, where the first label information is used to indicate a communication path, at a second network layer, from a node that receives the first communication information to a node that has a mapping relationship with a second primary node to which the non-primary node that receives communication belongs; and a first sending module 153 configured to send first information to a node at the second network layer, so that the node at the second network layer sends the first information to the second primary node according to the first label information using the communication path corresponding to the first label information, where the first information includes the first communication information and the first label information.

For a specific implementation manner of the first label information, refer to the description from the perspective of the foregoing method. Details are not described herein again.

In implementation, the determining module 152 is configured to, if determining that a label processing rule table stored by the node device includes label information corresponding to the communication path, determine the label information included in the label processing rule table as the first label information; or if determining that a label processing rule table stored by the node device does not include label information corresponding to the communication path, send, using the first sending module 153, the first communication information to a first domain controller to which the node device belongs, and determine label information returned by the first domain controller as the first label information.

Further, after the first sending module 153 sends the first communication information to the first domain controller, the determining module 152 is further configured to receive, using the first receiving module 151, label information that is allocated by the first domain controller to a communication path selected from the second network layer, where the selected communication path is from the node that receives the first communication information to the node that has the mapping relationship with the second primary node to which the non-primary node that receives communication belongs; and update, according to the received label information, the label processing rule table stored by the node device.

After receiving the first information sent by the first sending module 153, the first domain controller selects, from the second network layer according to control information that is released by the second network layer and used to indicate a load status of each node at the second network layer, the communication path from the node that receives the first communication information to the node that has the mapping relationship with the second primary node to which the non-primary node that receives communication belongs; allocates the label information to the selected communication path; and sends the allocated label information to the first receiving module 151.

Based on any one of the foregoing embodiments, the determining module 152 is further configured to receive, using the first receiving module 151, label information that is allocated by the first domain controller to which the node device belongs to a communication path reselected from the second network layer, where the reselected communication path is from the node that receives the first communication information to the node that has the mapping relationship with the second primary node to which the non-primary node that receives communication belongs; and update, according to the received label information, the label processing rule table stored by the node device.

After receiving the control information that is released by the second network layer and used to indicate the load status of each node at the second network layer, if determining, according to the control information, that the communication path for transmitting the first communication information needs to be updated, the first domain controller reselects, from the second network layer, the communication path from the node that receives the first communication information to the node that has the mapping relationship with the second primary node to which the non-primary node that receives communication belongs; allocates the label information to the reselected communication path; and sends the allocated label information to the first receiving module 151.

Figure 16:
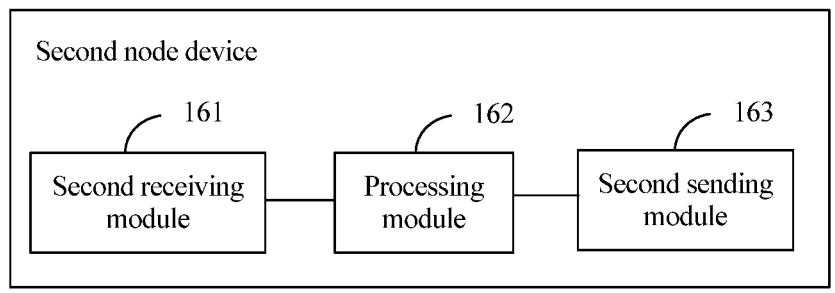
FIG. 16 is a schematic diagram of a second node device according to an embodiment of the present disclosure.

Based on a same disclosure concept, an embodiment of the present disclosure provides a second node device, and the node device is applied to multi-layer network communication. As shown in FIG. 16, the node device includes a second receiving module 161 configured to receive first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the second receiving module 161 belongs, the non-primary node that receives communication is in the domain to which the second receiving module belongs, and the first label information is used to indicate a communication path, at the second network layer, from a node that receives the first communication information to a node that has a mapping relationship with the node device; a processing module 162 configured to remove the first label information from the first information; and a second sending module 163 configured to send the first information obtained after the processing module 162 performs the removing processing to the non-primary node that receives communication.

In implementation, the processing module 162 is configured to process the first information according to a processing rule that is in a label processing rule table stored by the node device and that is used to instruct to process the first information including the first label information, where the processing rule instructs to remove the first label information from the first information, and send the first information obtained after the removing processing to the non-primary node that receives communication.

The processing, by the processing module 162, the first information according to a processing rule that is in a label processing rule table stored by the node device and that is used to instruct to process the first information including the first label information includes, if it is determined that the label processing rule table stored by the node device includes a processing rule that is used to instruct to process the first information including the first label information, processing the first information according to the processing rule included in the label processing rule table; or if it is determined that the label processing rule table stored by the node device does not include a processing rule that is used to instruct to process the first information including the first label information, sending, using the second sending module 163, the first information to a second domain controller to which the node device belongs, and processing the first information according to a processing rule returned by the second domain controller.

In implementation, after the second sending module 163 sends the first information to the second domain controller to which the node device belongs, the processing module 162 is further configured to receive, using the second receiving module 161, a processing rule configured by the second domain controller for the first information, and update, according to the received processing rule, the label processing rule table stored by the node device.

After receiving the first information sent by the second sending module 163, the second domain controller configures the processing rule for the first information, so as to instruct to remove the first label information from the first information, and send the first information obtained after the removing processing to the non-primary node that receives communication.

In implementation, the processing module 162 is further configured to receive, using the second receiving module 161, second label information sent by the second domain controller, and update, according to the received second label information, the label processing rule table stored by the node device, where the second label information is used to indicate a communication path, at the second network layer, from a node that receives second communication information to a node that has a mapping relationship with the first primary node, and the second communication information is sent from the non-primary node that receives communication to the non-primary node that sends communication.

After receiving the first information sent by the second sending module 163, the second domain controller selects, from the second network layer according to control information that is released by the second network layer and used to indicate a load status of each node at the second network layer, the communication path from the node that receives the second communication information to the node that has the mapping relationship with the first primary node; allocates the second label information to the selected communication path; and sends the second label information to the second receiving module 161.

In implementation, the processing module 162 is further configured to receive, using the second receiving module 161, second label information that is allocated by the second domain controller to a communication path reselected from the second network layer, where the reselected communication path is from the node that receives the second communication information to the node that has the mapping relationship with the first primary node; and update, according to the received second label information, the label processing rule table stored by the node device.

After receiving the control information that is released by the second network layer and used to indicate the load status of each node at the second network layer, if determining, according to the control information, that the communication path, at the second network layer, from the node that receives the second communication information to the node that has the mapping relationship with the first primary node needs to be updated, the second domain controller reselects, from the second network layer, the communication path from the node that receives the second communication information to the node that has the mapping relationship with the first primary node; allocates the second label information to the reselected communication path; and sends the allocated second label information to the second receiving module 161.

For specific implementation manners of the first label information and the second label information, refer to the description from the perspective of the foregoing method. Details are not described herein again.

Figure 17:
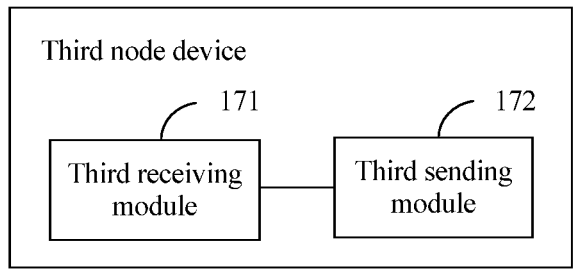
FIG. 17 is a schematic diagram of a third node device according to an embodiment of the present disclosure.

Based on a same disclosure concept, an embodiment of the present disclosure provides a third node device, and the node device is applied to multi-layer network communication. As shown in FIG. 17, the node device includes a third receiving module 171 configured to receive first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with the second primary node; and a third sending module 172 configured to send, according to the first label information using the communication path corresponding to the first label information, the first information to the second primary node to which the non-primary node that receives communication belongs.

For a specific implementation manner of the first label information, refer to the description from the perspective of the foregoing method. Details are not described herein again.

Figure 18:
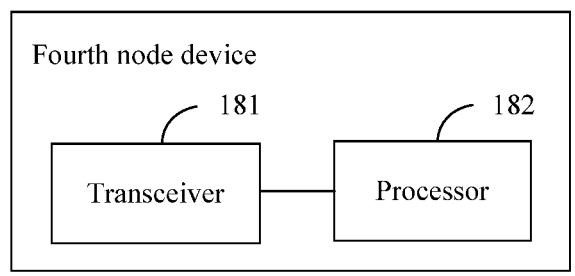
FIG. 18 is a schematic diagram of a fourth node device according to an embodiment of the present disclosure.

Based on a same disclosure concept, an embodiment of the present disclosure provides a fourth node device, and the node device is applied to multi-layer network communication. As shown in FIG. 18, the node device includes a transceiver 181 configured to receive first communication information sent, by a non-primary node that initiates communication, to a non-primary node that receives communication, where the non-primary node that initiates communication is in a domain to which the transceiver belongs, and the non-primary node that receives communication is in a domain at the first network layer different from the domain to which the transceiver belongs; and a processor 182 configured to determine first label information, where the first label information is used to indicate a communication path, at a second network layer, from a node that receives the first communication information to a node that has a mapping relationship with a second primary node to which the non-primary node that receives communication belongs; and send, using the transceiver 181, first information to a node at the second network layer, so that the node at the second network layer sends the first information to the second primary node according to the first label information using the communication path corresponding to the first label information, where the first information includes the first communication information and the first label information.

For a specific implementation manner of the first label information, refer to the description from the perspective of the foregoing method. Details are not described herein again.

In implementation, the processor 182 is configured to, if determining that a label processing rule table stored by the node device includes label information corresponding to the communication path, determine the label information included in the label processing rule table as the first label information; or if determining that a label processing rule table stored by the node device does not include label information corresponding to the communication path, send, using the transceiver 181, the first communication information to a first domain controller to which the node device belongs, and determine label information returned by the first domain controller as the first label information.

Further, after the transceiver 181 sends the first communication information to the first domain controller, the processor 182 is further configured to receive, using the transceiver 181, label information that is allocated by the first domain controller to a communication path selected from the second network layer, where the selected communication path is from the node that receives the first communication information to the node that has the mapping relationship with the second primary node to which the non-primary node that receives communication belongs; and update, according to the received label information, the label processing rule table stored by the node device.

After receiving the first information sent by the transceiver 181, the first domain controller selects, from the second network layer according to control information that is released by the second network layer and used to indicate a load status of each node at the second network layer, the communication path from the node that receives the first communication information to the node that has the mapping relationship with the second primary node to which the non-primary node that receives communication belongs; allocates the label information to the selected communication path; and sends the allocated label information to the transceiver 181.

Based on any one of the foregoing embodiments, the processor 182 is further configured to receive, using the transceiver 181, label information that is allocated by the first domain controller to which the node device belongs to a communication path reselected from the second network layer, where the reselected communication path is from the node that receives the first communication information to the node that has the mapping relationship with the second primary node to which the non-primary node that receives communication belongs; and update, according to the received label information, the label processing rule table stored by the node device.

After receiving the control information that is released by the second network layer and used to indicate the load status of each node at the second network layer, if determining, according to the control information, that the communication path for transmitting the first communication information needs to be updated, the first domain controller reselects, from the second network layer, the communication path from the node that receives the first communication information to the node that has the mapping relationship with the second primary node to which the non-primary node that receives communication belongs; allocates the label information to the reselected communication path; and sends the allocated label information to the transceiver 181.

Figure 19:
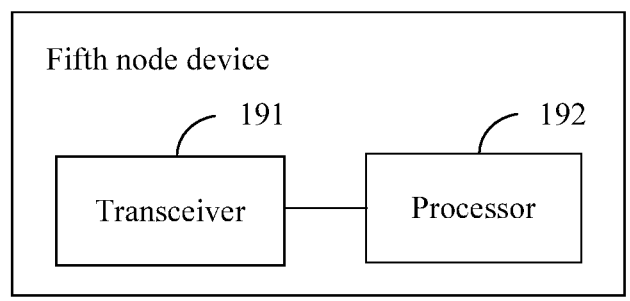
FIG. 19 is a schematic diagram of a fifth node device according to an embodiment of the present disclosure.

Based on a same disclosure concept, an embodiment of the present disclosure provides a fifth node device, and the node device is applied to multi-layer network communication. As shown in FIG. 19, the node device includes a transceiver 191 configured to receive first information sent by a node at a second network layer, where the first information includes first communication information and first label information that are sent, by a non-primary node that initiates communication, to a non-primary node that receives communication, the non-primary node that initiates communication is located in a domain at the first network layer different from a domain to which the node device belongs, the non-primary node that receives communication is in a domain to which the transceiver belongs, and the first label information is used to indicate a communication path, at the second network layer, from a node that receives the first communication information to a node that has a mapping relationship with the node device; and a processor 192 configured to remove the first label information from the first information; and send, using the transceiver 191, the first information obtained after the removing processing to the non-primary node that receives communication.

In implementation, the processor 192 is configured to process the first information according to a processing rule that is in a label processing rule table stored by the node device and that is used to instruct to process the first information including the first label information, where the processing rule instructs to remove the first label information from the first information, and send the first information obtained after the removing processing to the non-primary node that receives communication.

The processing, by the processor 192, the first information according to a processing rule that is in a label processing rule table stored by the node device and that is used to instruct to process the first information including the first label information includes, if it is determined that the label processing rule table stored by the node device includes a processing rule that is used to instruct to process the first information including the first label information, processing the first information according to the processing rule included in the label processing rule table; or if it is determined that the label processing rule table stored by the node device does not include a processing rule that is used to instruct to process the first information including the first label information, sending, using the transceiver 191, the first information to a second domain controller to which the node device belongs, and processing the first information according to a processing rule returned by the second domain controller.

In implementation, after the transceiver 191 sends the first information to the second domain controller to which the node device belongs, the processor 192 is further configured to receive, using the transceiver 191, a processing rule configured by the second domain controller for the first information, and update, according to the received processing rule, the label processing rule table stored by the node device. After receiving the first information sent by the transceiver 191, the second domain controller configures the processing rule for the first information, so as to instruct to remove the first label information from the first information, and send the first information obtained after the removing processing to the non-primary node that receives communication.

In implementation, the processor 192 is further configured to receive, using the transceiver 191, second label information sent by the second domain controller, and update, according to the received second label information, the label processing rule table stored by the node device, where the second label information is used to indicate a communication path, at the second network layer, from a node that receives second communication information to a node that has a mapping relationship with the first primary node, and the second communication information is sent from the non-primary node that receives communication to the non-primary node that sends communication.

After receiving the first information sent by the transceiver 191, the second domain controller selects, from the second network layer according to control information that is released by the second network layer and used to indicate a load status of each node at the second network layer, the communication path from the node that receives the second communication information to the node that has the mapping relationship with the first primary node; allocates the second label information to the selected communication path; and sends the second label information to the transceiver 191.

In implementation, the processor 192 is further configured to receive, using the transceiver 191, second label information that is allocated by the second domain controller to a communication path reselected from the second network layer, where the reselected communication path is from the node that receives the second communication information to the node that has the mapping relationship with the first primary node; and update, according to the received second label information, the label processing rule table stored by the node device.

After receiving the control information that is released by the second network layer and used to indicate the load status of each node at the second network layer, if determining, according to the control information, that the communication path, at the second network layer, from the node that receives the second communication information to the node that has the mapping relationship with the first primary node needs to be updated, the second domain controller reselects, from the second network layer, the communication path from the node that receives the second communication information to the node that has the mapping relationship with the first primary node; allocates the second label information to the reselected communication path; and sends the allocated second label information to the transceiver 191.

For specific implementation manners of the first label information and the second label information, refer to the description from the perspective of the foregoing method. Details are not described herein again.

Figure 20:
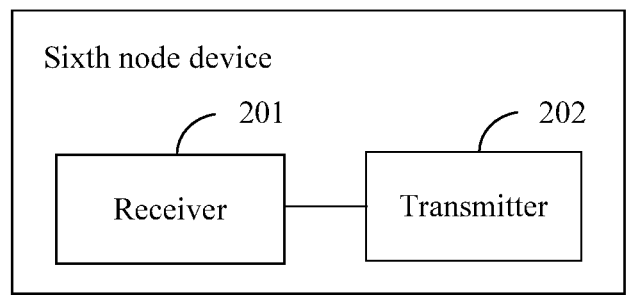
FIG. 20 is a schematic diagram of a sixth node device according to an embodiment of the present disclosure.

Based on a same disclosure concept, an embodiment of the present disclosure provides a sixth node device, and the node device is applied to multi-layer network communication. As shown in FIG. 20, the node device includes a receiver 201 configured to receive first information sent by a first primary node at a first network layer, where the first information includes first communication information and first label information that are sent, by a non-primary node that initiates communication, to a non-primary node that receives communication, the non-primary node that initiates communication is in a domain to which the first primary node belongs, the non-primary node that receives communication is located in a different domain at the first network layer, and the first label information is used to indicate a communication path, at the second network layer, from a node that receives the first communication information to a node that has a mapping relationship with the second primary node; and a transmitter 202 configured to send, according to the first label information using the communication path corresponding to the first label information, the first information to the second primary node to which the non-primary node that receives communication belongs.

For a specific implementation manner of the first label information, refer to the description from the perspective of the foregoing method. Details are not described herein again.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a Machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A network communication method applied to multi-layer network communication on a multi-layer network, wherein the multi-layer network includes a first network layer and a second network layer, wherein the first network layer includes a first primary node to which a non-primary node that initiates communication belongs, and a second primary node to which a non-primary node that receives communication belongs, wherein the non-primary node that initiates communication and the non-primary node that receives communication are located in different domains, and wherein the method comprises:

receiving, by the first primary node, first communication information sent, by the non-primary node that initiates communication, to the non-primary node that receives communication, wherein the non-primary node that initiates communication is in a domain to which the first primary node belongs;

determining, by the first primary node, first label information, wherein the first label information indicates a communication path, at the second network layer, from a first node of the second network layer that receives the first communication information to a second node of the second network layer that has a mapping relationship with the second primary node to which the non-primary node that receives communication belongs; and sending, by the first primary node, first information to the first node of the second network layer to cause the first node of the second network layer to send the first information to the second primary node via the second node of the second network layer according to the first label information using the communication path at the second network layer, wherein the first information comprises the first communication information and the first label information.

2. The method of claim 1, wherein determining, by the first primary node, the first label information comprises determining, by the first primary node, label information comprised in a label processing rule table as the first label information when the label processing rule table stored by the first primary node comprises label information corresponding to the communication path.

3. The method of claim 1, wherein determining, by the first primary node, the first label information comprises:

sending, by the first primary node, the first communication information to a first domain controller to which the first primary node belongs, and determining label information returned by the first domain controller as the first label information when a label processing rule table stored by the first primary node does not comprise label information corresponding to the communication path;

wherein after sending, by the first primary node, the first communication information to the first domain controller to which the first primary node belongs, the method further comprises:

receiving, by the first primary node, label information that is allocated by the first domain controller to a communication path selected from the second network layer, wherein the selected communication path is from the first node of the second network layer that receives the first communication information to the second node of the second network layer that has the mapping relationship with the second primary node to which the non-primary node that receives communication belongs; and updating, according to the received label information, the label processing rule table stored by the first primary node, and wherein after receiving the first information from the first primary node, the first domain controller is configured to:

select, from the second network layer according to control information that is released by the second network layer and used to indicate a load status of each node of the second network layer, the communication path from the first node of the second network layer that receives the first communication information to the second node of the second network layer that has the mapping relationship with the second primary node to which the non-primary node that receives communication belongs;
allocate the label information to the selected communication path; and
send the allocated label information to the first primary node.

4. The method of claim 3, further comprising:
receiving, by the first primary node, label information that is allocated by the first domain controller to which the first primary node belongs to a communication path reselected from the second network layer, wherein the reselected communication path is from the first node of the second network layer that receives the first communication information to the second node of the second network layer that has the mapping relationship with the second primary node to which the non-primary node that receives communication belongs; and
updating, according to the received label information, the label processing rule table stored by the first primary node,
wherein after receiving control information that is released by the second network layer and that indicates the load status of each node of the second network layer, when it is determined, according to the control information, that the communication path needs to be updated, the first domain controller is configured to:
reselect, from the second network layer, the communication path from the first node of the second network layer that receives the first communication information to the second node of the second network layer that has the mapping relationship with the second primary node to which the non-primary node that receives communication belongs;
allocate the label information to the reselected communication path; and
send the allocated label information to the first primary node.

5. The method of claim 1, wherein the first label information comprises encoding information of each node in the communication path, at the second network layer, from the first node of the second network layer that receives the first communication information to the second node of the second network layer that has the mapping relationship with the second primary node.

6. A network communication method, wherein the method is applied to multi-layer network communication on a multi-layer network, wherein the multi-layer network includes a first network layer and a second network layer, wherein the first network layer includes a first primary node to which a non-primary node that initiates communication belongs, and a second primary node to which a non-primary node that receives communication belongs, wherein the non-primary node that initiates communication and the non-primary node that receives communication are located in different domains, and wherein the method comprises:
receiving, by the second primary node, first information from a second node of the second network layer that has a mapping relationship with the second primary node, wherein the first information comprises first communication information and first label information that are sent, via a first communication path and by the non-primary node that initiates communication, to the non-primary node that receives communication, wherein the non-primary node that receives communication is in the domain to which the second primary node belongs, and wherein the first label information indicates the first communication path, wherein the first communication path is at the second network layer and is from a first node of the second network layer that receives the first communication information to the second node of the second network layer that has the mapping relationship with the second primary node;
removing, by the second primary node, the first label information from the first information; and
sending the first information obtained after the removing processing to the non-primary node that receives communication.

7. The method of claim 6, wherein removing, by the second primary node, the first label information from the first information, and sending the first information obtained after the removing processing to the non-primary node that receives communication comprises processing, by the second primary node, the first information according to a processing rule that is in a label processing rule table stored by the second primary node and that is used to instruct to process the first information comprising the first label information, wherein the processing rule instructs to remove the first label information from the first information and send the first information obtained after the removing processing to the non-primary node that receives communication.

8. The method of claim 7, wherein processing, by the second primary node, the first information according to the processing rule that is in the label processing rule table stored by the second primary node and that is used to instruct to process the first information comprising the first label information comprises processing, by the second primary node, the first information according to the processing rule comprised in the label processing rule table when the second primary node determines that the label processing rule table stored by the second primary node comprises the processing rule that is used to instruct to process the first information comprising the first label information.

9. The method of claim 7, wherein processing, by the second primary node, the first information according to the processing rule that is in the label processing rule table stored by the second primary node and that is used to instruct to process the first information comprising the first label information comprises:
sending, by the second primary node, the first information to a second domain controller to which the second primary node belongs; and
processing the first information according to a processing rule returned by the second domain controller when the second primary node determines that the label processing rule table stored by the second primary node does not comprise the processing rule that is used to instruct to process the first information comprising the first label information,
wherein after sending, by the second primary node, the first information to the second domain controller to which the second primary node belongs, the method further comprises:
receiving, by the second primary node, a processing rule configured by the second domain controller for the first information; and
updating, according to the received processing rule, the label processing rule table stored by the second primary node, and
wherein after receiving the first information from the second primary node, the second domain controller configures the processing rule for the first information to instruct to remove the first label information from the first information and send the first information obtained after the removing processing to the non-primary node that receives communication.

10. The method of claim 9, further comprising:
receiving, by the second primary node, second label information sent by the second domain controller; and
updating, according to the received second label information, the label processing rule table stored by the second primary node, wherein the second label information is used to indicate a second communication path, at the second network layer, from a third node of the second network layer that receives second communication information to a fourth node of the second network layer that has a mapping relationship with the first primary node, and wherein the second communication information is sent from the non-primary node that receives communication to the non-primary node that sends communication,
wherein after receiving the first information from the second primary node, the second domain controller is configured to:
select, from the second network layer according to control information that is released by the second network layer and used to indicate a load status of each node of the second network layer, the second communication path from the third node of the second network layer that receives the second communication information to the fourth node of the second network layer that has the mapping relationship with the first primary node;
allocate the second label information to the selected communication path; and
send the second label information to the second primary node.

11. The method of claim 10, further comprising:
receiving, by the second primary node, second label information that is allocated by the second domain controller to a communication path reselected for transmitting the second communication information; and
updating, according to the received second label information, the label processing rule table stored by the second primary node,
wherein after receiving the control information that is released by the second network layer and used to indicate the load status of each node of the second network layer, when determining, according to the control information, that the communication path, at the second network layer, from the third node of the second network layer that receives the second communication information to the fourth node of the second network layer that has the mapping relationship with the first primary node needs to be updated, the second domain controller is configured to:
reselect, from the second network layer, the communication path from the third node of the second network layer that receives the second communication information to the fourth node of the second network layer that has the mapping relationship with the first primary node;
allocate the second label information to the reselected communication path; and
send the allocated second label information to the second primary node.

12. The method of claim 10, wherein the second label information comprises:
encoding information of each node in the second communication path, at the second network layer, from the third node of the second network layer that receives the second communication information to the fourth node of the second network layer that has the mapping relationship with the first primary node;
encoding information of a link between nodes in the second communication path, at the second network layer, from the third node of the second network layer that receives the second communication information to the fourth node of the second network layer that has the mapping relationship with the first primary node;
encoding information of a port of each node in the second communication path, at the second network layer, from the third node of the second network layer that receives the second communication information to the fourth node of the second network layer that has the mapping relationship with the first primary node; or
location coordinate information and preset routing direction information that are of the third node of the second network layer that receives the second communication information and the fourth node of the second network layer that has the mapping relationship with the first primary node.

13. The method of claim 6, wherein the first label information comprises:
encoding information of each node in the first communication path, at the second network layer, from the first node of the second network layer that receives the first communication information to the second node of the second network layer that has the mapping relationship with the second primary node;
encoding information of a link between nodes in the first communication path, at the second network layer, from the first node of the second network layer that receives the first communication information to the second node of the second network layer that has the mapping relationship with the second primary node;
encoding information of a port of each node in the first communication path, at the second network layer, from the first node of the second network layer that receives the first communication information to the second node of the second network layer that has the mapping relationship with the second primary node; or
location coordinate information and preset routing direction information that are of the first node of the second network layer that receives the first communication information and the second node of the second network layer that has the mapping relationship with the second primary node.

14. A network communication method, wherein the method is applied to multi-layer network communication on a multi-layer network, wherein the multi-layer network includes a first network layer and a second network layer, wherein the first network layer includes a first primary node to which a non-primary node that initiates communication belongs, and a second primary node to which a non-primary node that receives communication belongs, wherein the non-primary node that initiates communication and the non-primary node that receives communication are located in different domains, and wherein the method comprises:
receiving, by a first node of the second network layer, first information from the first primary node of the first network layer, wherein the first information comprises first communication information and first label information that are sent, via a first communication path and by the non-primary node that initiates communication, to the non-primary node that receives communication, wherein the non-primary node that initiates communication is in a domain to which the first primary node belongs, and wherein the first label information indicates the first communication path, wherein the first communication path is at the second network layer and is from the first node of the second network layer that receives the first communication information to a second node of the second network layer that has a mapping relationship with the second primary node; and sending, by the first node of the second network layer, according to the first label information and using the first communication path at the second network layer, the first information to the second primary node to which the non-primary node that receives communication belongs.

15. The method of claim 14, wherein the first label information comprises encoding information of each node in the first communication path, at the second network layer, from the first node of the second network layer that receives the first communication information to the second node of the second network layer that has the mapping relationship with the second primary node.

16. A node device, wherein the node device is applied to multi-layer network communication on a multi-layer network, wherein the multi-layer network includes a first network layer and a second network layer, wherein the first network layer includes a first primary node to which a non-primary node that initiates communication belongs, and a second primary node to which a non-primary node that receives communication belongs, wherein the non-primary node that initiates communication and the non-primary node that receives communication are located in different domains, and wherein the node device comprises:

a receiver configured to receive first communication information sent, via a first communication path and by the non-primary node that initiates communication, to the non-primary node that receives communication, wherein the non-primary node that initiates communication is in a domain to which the receiver belongs;

a processor coupled to the receiver and configured to determine first label information, wherein the first label information indicates the first communication path, wherein the first communication path is at the second network layer and is from a first node of the second network layer that receives the first communication information to a second node of the second network layer that has a mapping relationship with the second primary node to which the non-primary node that receives communication belongs; and a transmitter coupled to the processor and configured to send first information to the first node of the second network layer to cause the first node of the second network layer to send the first information to the second primary node via the second node of the second network layer according to the first label information using the first communication path at the second network layer, wherein the first information comprises the first communication information and the first label information.

17. The node device of claim 16, wherein the processor is further configured to:

determine label information comprised in a label processing rule table as the first label information when the label processing rule table stored by the node device comprises label information corresponding to the first communication path; or send, using the transmitter, the first communication information to a first domain controller to which the node device belongs, and determine label information returned by the first domain controller as the first label information when the label processing rule table stored by the node device does not comprise label information corresponding to the first communication path.

18. The node device of claim 17, wherein, when the processor is further configured to send, using the transmitter, the first communication information to the first domain controller to which the node device belongs, after the transmitter sends the first communication information to the first domain controller, the processor is further configured to:

receive, using the receiver, label information that is allocated by the first domain controller to a communication path selected from the second network layer, wherein the selected communication path is from the first node of the second network layer that receives the first communication information to the second node of the second network layer that has the mapping relationship with the second primary node to which the non-primary node that receives communication belongs; and update, according to the received label information, the label processing rule table stored by the node device, wherein after receiving the first information from the transmitter, the first domain controller is configured to:

select, from the second network layer according to control information that is released by the second network layer and used to indicate a load status of each node at the second network layer, the selected communication path from the node of the second network layer that receives the first communication information to the second node of the second network layer that has the mapping relationship with the second primary node to which the non-primary node that receives communication belongs;

allocate the label information to the selected communication path; and send the allocated label information to the receiver.

19. The node device of claim 18, wherein the processor is further configured to:

receive, using the receiver, label information that is allocated by the first domain controller to which the node device belongs to a communication path reselected from the second network layer, wherein the reselected communication path is from the first node of the second network layer that receives the first communication information to the second node of the second network layer that has the mapping relationship with the second primary node to which the non-primary node that receives communication belongs; and update, according to the received label information, the label processing rule table stored by the node device, wherein after receiving control information that is released by the second network layer and used to indicate the load status of each node of the second network layer, when it is determined, according to the control information, that the communication path for transmitting the first communication information needs to be updated, the first domain controller is configured to:

reselect, from the second network layer, the communication path from the first node of the second network layer that receives the first communication information to the second node of the second network layer that has the mapping relationship with the second primary node to which the non-primary node that receives communication belongs;

allocate the label information to the reselected communication path; and send the allocated label information to the receiver.

20. The node device of claim 16, wherein the first label information comprises:

encoding information of each node in the first communication path, at the second network layer, from the first node of the second network layer that receives the first communication information to the second node of the second network layer that has the mapping relationship with the second primary node;

encoding information of a link between nodes in the first communication path, at the second network layer, from the first node of the second network layer that receives the first communication information to the second node of the second network layer that has the mapping relationship with the second primary node;

encoding information of a port of each node in the first communication path, at the second network layer, from the first node of the second network layer that receives the first communication information to the second node of the second network layer that has the mapping relationship with the second primary node; or location coordinate information and preset routing direction information that are of the first node of the second network layer that receives the first communication information and the second node of the second network layer that has the mapping relationship with the second primary node.

21. A node device, wherein the node device is applied to multi-layer network communication on a multi-layer network, wherein the multi-layer network includes a first network layer and a second network layer, wherein the first network layer includes a first primary node to which a non-primary node that initiates communication belongs, and a second primary node to which a non-primary node that receives communication belongs, wherein the non-primary node that initiates communication and the non-primary node that receives communication are located in different domains, and wherein the node device comprises:

a receiver configured to receive first information from a second node of the second network layer, wherein the first information comprises first communication information and first label information that are sent, via a first communication path and by the non-primary node that initiates communication, to the non-primary node that receives communication, wherein the non-primary node that receives communication is in the domain to which the receiver belongs, and wherein the first label information indicates the first communication path, wherein the first communication path is at the second network layer and is from a first node of the second network layer that receives the first communication information to the second node of the second network layer that has a mapping relationship with the node device;

a processor coupled to the receiver and configured to remove the first label information from the first information; and a transmitter coupled to the processor and configured to send the first information obtained after the processor performs removing processing to the non-primary node that receives communication.

22. The node device of claim 21, wherein the processor is further configured to process the first information according to a processing rule that is in a label processing rule table stored by the node device and that is used to instruct to process the first information comprising the first label information, wherein the processing rule instructs to remove the first label information from the first information, and send the first information obtained after removing processing to the non-primary node that receives communication.

23. The node device of claim 22, wherein processing, by the processor, the first information according to the processing rule that is in the label processing rule table stored by the node device and that is used to instruct to process the first information comprising the first label information comprises:

processing the first information according to the processing rule comprised in the label processing rule table when the label processing rule table stored by the node device comprises the processing rule that is used to instruct to process the first information comprising the first label information; or when the label processing rule table stored by the node device does not comprise the processing rule that is used to instruct to process the first information comprising the first label information:

sending, using the transmitter, the first information to a second domain controller to which the node device belongs; and processing the first information according to a processing rule returned by the second domain controller.

24. The node device of claim 23, wherein after the transmitter sends the first information to the second domain controller to which the node device belongs, the processor is further configured to:

receive, using the receiver, a processing rule configured by the second domain controller for the first information; and update, according to the received processing rule, the label processing rule table stored by the node device, wherein after receiving the first information sent by the transmitter, the second domain controller configures the processing rule for the first information to instruct to remove the first label information from the first information, and send the first information obtained after removing processing to the non-primary node that receives communication.

25. The node device of claim 23, wherein the processor is further configured to:

receive, using the receiver, second label information sent by the second domain controller; and update, according to the received second label information, the label processing rule table stored by the node device, wherein the second label information is used to indicate a second communication path, at the second network layer, from a third node of the second network layer that receives second communication information to a fourth node of the second network layer that has a mapping relationship with the first primary node, and wherein the second communication information is sent from the non-primary node that receives communication to the non-primary node that sends communication, wherein after receiving the first information sent by the transmitter, the second domain controller is configured to:

select, from the second network layer according to control information that is released by the second network layer and used to indicate a load status of each node of the second network layer, the second communication path from the third node of the second network layer that receives the second communication information to the fourth node of the second network layer that has the mapping relationship with the first primary node;
allocate the second label information to the selected communication path; and
send the second label information to the receiver.

26. The node device of claim 25, wherein the processor is further configured to:
receive, using the receiver, second label information that is allocated by the second domain controller to a communication path reselected from the second network layer, wherein the reselected communication path is from the first node of the second network layer that receives the second communication information to the second node of the second network layer that has the mapping relationship with the first primary node; and
update, according to the received second label information, the label processing rule table stored by the node device;
wherein after receiving the control information that is released by the second network layer and used to indicate the load status of each node of the second network layer, when determining, according to the control information, that the second communication path, at the second network layer, from the third node of the second network layer that receives the second communication information to the fourth node of the second network layer that has the mapping relationship with the first primary node needs to be updated, the second domain controller is configured to:
reselect, from the second network layer, the communication path from the third node of the second network layer that receives the second communication information to the fourth node of the second network layer that has the mapping relationship with the first primary node;
allocate the second label information to the reselected communication path; and
send the allocated second label information to the receiver.

27. The node device of claim 25, wherein the second label information comprises:
encoding information of each node in the second communication path, at the second network layer, from the third node of the second network layer that receives the second communication information to the fourth node of the second network layer that has the mapping relationship with the first primary node;
encoding information of a link between nodes in the second communication path, at the second network layer, from the third node of the second network layer that receives the second communication information to the fourth node that has the mapping relationship with the first primary node;
encoding information of a port of each node in the second communication path, at the second network layer, from the third node of the second network layer that receives the second communication information to the fourth node of the second network layer that has the mapping relationship with the first primary node; or
location coordinate information and preset routing direction information that are of the third node of the second network layer that receives the second communication information and the fourth node of the second network layer that has the mapping relationship with the first primary node.

28. The node device of claim 21, wherein the first label information comprises:
encoding information of each node in the first communication path, at the second network layer, from the first node of the second network layer that receives the first communication information to the second node of the second network layer that has the mapping relationship with the node device;
encoding information of a link between nodes in the first communication path, at the second network layer, from the first node of the second network layer that receives the first communication information to the second node of the second network layer that has the mapping relationship with the node device;
encoding information of a port of each node in the first communication path, at the second network layer, from the first node of the second network layer that receives the first communication information to the second node of the second network layer that has the mapping relationship with the node device; or
location coordinate information and preset routing direction information of the first node that of the second network layer that receives the first communication information and the second node of the second network layer that has the mapping relationship with the node device.

29. A node device, wherein the node device is applied to multi-layer network communication on a multi-layer network, wherein the multi-layer network includes a first network layer and a second network layer, wherein the first network layer includes a first primary node to which a non-primary node that initiates communication belongs, and a second primary node to which a non-primary node that receives communication belongs, wherein the non-primary node that initiates communication and the non-primary node that receives communication are located in different domains, and wherein the node device comprises:
a receiver configured to receive first information from the first primary node at the first network layer, wherein the first information comprises first communication information and first label information that are sent, via a first communication path and by the non-primary node that initiates communication, to the non-primary node that receives communication, wherein the non-primary node that initiates communication is in a domain to which the first primary node belongs, and wherein the first label information indicates the first communication path, wherein the first communication path is at the second network layer and is from a first node of the second network layer that receives the first communication information to a second node of the second network layer that has a mapping relationship with the second primary node; and
a transmitter coupled to the receiver and configured to send, according to the first label information using the first communication path corresponding to the first label information, the first information to the second primary node to which the non-primary node that receives communication belongs.

30. The node device of claim 29, wherein the first label information comprises:
encoding information of each node in the first communication path, at the second network layer, from the first node of the second network layer that receives the first communication information to the second node of the second network layer that has the mapping relationship with the second primary node;

encoding information of a link between nodes in the first communication path, at the second network layer, from the first node of the second network layer that receives the first communication information to the second node of the second network layer that has the mapping relationship with the second primary node;

encoding information of a port of each node in the first communication path, at the second network layer, from the first node of the second network layer that receives the first communication information to the second node that has the mapping relationship with the second primary node; or location coordinate information and preset routing direction information of the first node of the second network layer that receives the first communication information and the second node of the second network layer that has the mapping relationship with the second primary node.

31. An Internet system, comprising:
a first network layer divided into at least one domain according to a range of exchanging or routing communication information; and
a second network layer comprising at least one node;
wherein each domain comprises a non-primary node and at least one primary node configured to control data exchange or data routing in the domain,
wherein each primary node controls a non-primary node in a domain to which the primary node belongs to perform inter-domain or intra-domain communication,
wherein a primary node of the first network layer comprises a first primary node to which a non-primary node that initiates communication belongs and a second primary node to which a non-primary node that receives communication belongs,
wherein the first primary node is configured to:
  receive first communication information sent, via a first communication path and by the non-primary node that initiates communication, to the non-primary node that receives communication, wherein the non-primary node that initiates communication is in a domain to which the first primary node belongs, and the non-primary node that receives communication is in a different domain at the first network layer;
  determine first label information, wherein the first label information indicates the first communication path, wherein the first communication path is at the second network layer and is from a first node of the second network layer that receives the first communication information to a second node of the second network layer that has a mapping relationship with the second primary node to which the non-primary node that receives communication belongs; and
  send first information to the first node of the second network layer, wherein the first information comprises the first communication information and the first label information,
wherein the first node of the second network layer is configured to:
  receive the first information sent by the first primary node; and
  send, according to the first label information using the first communication path at the second network layer, the first information to the second primary node to which the non-primary node that receives communication belongs, and
wherein the second primary node is configured to:
  receive the first information sent by the first node of the second network layer;
  remove the first label information from the first information; and
  send the first information obtained after removing processing to the non-primary node that receives communication.

32. The Internet system of claim 31, further comprising a third network layer configured to:
  perform format conversion on the first information after receiving the first information sent by the first primary node; and
  forward the first information obtained after the format conversion to the second network layer; or
  cache the first information sent by the first primary node after receiving the first information sent by the first primary node.

33. The Internet system of claim 31, wherein the first label information comprises:
  encoding information of each node in the first communication path, at the second network layer, from the first node of the second network layer that receives the first communication information to the second node of the second network layer that has the mapping relationship with the second primary node;
  encoding information of a link between nodes in the first communication path, at the second network layer, from the first node of the second network layer that receives the first communication information to the second node of the second network layer that has the mapping relationship with the second primary node;
  encoding information of a port of each node in the first communication path, at the second network layer, from the first node of the second network layer that receives the first communication information to the second node of the second network layer that has the mapping relationship with the second primary node;
  location coordinate information and preset routing direction information of the first node of the second network layer that receives the first communication information and the second node of the second network layer that has the mapping relationship with the second primary node.

* * * * *